United States Patent [19]

Mann

[11] Patent Number: 6,021,477
[45] Date of Patent: Feb. 1, 2000

[54] MULTIPLE MODE MEMORY MODULE

[75] Inventor: Edward D. Mann, Methuen, Mass.

[73] Assignee: Samsung Electronics Co., Ltd, Suwon, Rep. of Korea

[21] Appl. No.: 08/092,628

[22] Filed: Jul. 15, 1993

Related U.S. Application Data

[60] Continuation of application No. 07/786,327, Oct. 31, 1991, Pat. No. 5,261,073, which is a division of application No. 07/348,318, May 5, 1989, Pat. No. 5,307,469.

[51] Int. Cl.$^7$ ................................................. G06F 13/14
[52] U.S. Cl. .......................................... 711/167; 711/154
[58] Field of Search ................................ 395/400, 425; 365/230.03, 230.04; 711/1, 104, 105, 154, 156, 167

[56] References Cited

U.S. PATENT DOCUMENTS

| | | | |
|---|---|---|---|
| 4,309,754 | 1/1982 | Dinwiddie, Jr. ......................... | 395/325 |
| 4,366,539 | 12/1982 | Johnson et al. ......................... | 395/425 |
| 4,371,928 | 2/1983 | Barlow et al. .......................... | 395/325 |
| 4,467,443 | 8/1984 | Shima ..................................... | 395/425 |
| 4,509,113 | 4/1985 | Heath ...................................... | 395/275 |
| 4,580,214 | 4/1986 | Kubo et al. .............................. | 395/425 |
| 4,631,671 | 12/1986 | Kawashita et al. ...................... | 395/325 |
| 4,716,545 | 12/1987 | Whipple et al. ......................... | 395/425 |
| 4,727,475 | 2/1988 | Kiremidjian ............................. | 395/800 |
| 4,763,302 | 8/1988 | Yamuda ............................... | 365/230.02 |
| 4,839,856 | 6/1989 | Tanaka .................................... | 395/425 |
| 4,849,937 | 7/1989 | Yoshimoto .......................... | 365/189.05 |
| 4,943,907 | 7/1990 | Godwin ................................... | 395/425 |
| 4,947,366 | 8/1990 | Johnson ................................... | 395/325 |
| 4,980,850 | 12/1990 | Morgan ................................... | 395/425 |
| 5,029,124 | 7/1991 | Leahy et al. ............................. | 395/425 |
| 5,301,278 | 4/1994 | Bowater et al. ......................... | 395/275 |

FOREIGN PATENT DOCUMENTS

| | | | |
|---|---|---|---|
| 15271 | 1/1982 | Japan ............................... | 365/230.04 |

*Primary Examiner*—Eddie P. Chan
*Assistant Examiner*—Kevin L. Ellis
*Attorney, Agent, or Firm*—Banner & Witcoff, Ltd

[57] ABSTRACT

A memory control unit is coupled during use to a system bus for receiving memory addresses therefrom. The memory control unit is further coupled during use to one or more memory units by a second bus that includes a plurality of signal lines for transmitting, during a memory access cycle, a memory address to the one or more memory units. Each of the one or more memory units includes a plurality of semiconductor memory devices having a plurality of addressable memory storage locations. The memory control unit further includes circuitry that is coupled to and responsive to a signal asserted on the second bus by one of the memory units selected by the transmitted memory address. The asserted signal indicates an access speed of the selected memory unit, and specifies a duration of the memory access on an access-by-access basis so as to make a duration of the memory access cycle compatible with the access speed of at least the semiconductor memory devices of the selected memory unit.

6 Claims, 20 Drawing Sheets

MULTIPLE MODE MEMORY MODULE

This is a continuation of U.S. patent application Ser. No. 07/786,327, filed on Oct. 31, 1991, now U.S. Pat. No. 5,261,073, which is a division of U.S. patent application Ser. No. 07/348,318, filed on May 5, 1999, now U.S. Pat. No. 5,303,469.

FIELD OF THE INVENTION

This invention relates generally to a memory module for an information processing system and, in particular, to a memory module having selectable operating modes including a selectable data bus width and a selectable memory device control signal generation.

BACKGROUND OF THE INVENTION

A memory module for an information processing system typically includes a substrate, such as a printed circuit board, a plurality of memory device integrated circuits, such as dynamic random access memories (DRAMS), and associated logic for generating memory timing and control signals, latching data, etc. One or more of the memory modules are coupled to a system bus of an information processing system and provide storage of data and instructions for one or more central processing units (CPUs) which are also coupled to the system bus. In some systems the memory module(s) may be coupled to the system bus via a memory bus and a memory control unit (MCU), the MCU being interposed between the system bus and the memory bus.

The system bus normally includes a data bus having a predetermined number of signal lines for defining a width of the bus. For example, a data bus may have 8, 16, 32, 64 or more signal lines for conveying an equal number of data bits. Modern, high performance systems are generally characterized by a data bus width of 64 bits (double-word) or 128 bits (quad-word).

The system bus normally also includes an address bus for defining data storage address locations within the memory module(s). The number of signal lines which comprise the address bus is directly related to the number of address storage locations which may be directly addressed by the the bus. For example, 20 address signal lines can directly address approximately one million address locations. Modern systems may have 28 or more address signal lines. For some system bus architectures the address bus is provided as a discrete bus while for other types of systems the address bus is time shared, or multiplexed, with all or a portion of the data bus. For these latter type of systems the multiplexed signal lines can convey an address during a first portion of a system bus cycle and convey data relating to the address during a second portion of the system bus cycle.

The system bus typically also includes a number of control signal lines such as memory read and write strobes, clock and bus cycle timing signal lines, etc.

Conventional practice in the design and manufacture of memory modules is to provide a module suitable for use with only one system bus or memory bus configuration. That is, the memory module is designed to accommodate a fixed data bus width, such as 64 or 128 bits. It can be appreciated that if a manufacturer of information processing systems provides different types of systems having different data bus widths that a memory module having a fixed bus width would not be useable in two or more different types of systems.

Also, DRAM devices are available in a number of operating configurations including page mode and static column mode. During a conventional page mode access cycle a row address is applied to the device, a row address strobe (RAS*) signal is asserted, a column address is applied and a column address strobe (CAS*) signal is asserted such that a particular address location within the DRAM is selected. The device is repetitively accessed in the page mode by incrementing the column address and reasserting CAS* without incurring the overhead of also changing the row address and reasserting RAS*. Thus, a conventional page mode type of DRAM page mode operation includes repetitive assertions of CAS*.

In a static column type of device the DRAM includes circuitry which detects transitions of the column address signals. With this type of device the requirement of repetitively asserting CAS* is eliminated in that applying a new column address, with CAS* remaining asserted, is sufficient to initiate a device read or write access cycle to the selected address. In general, static column operation results in a faster access cycle in that set-up and hold times associated with CAS* are eliminated.

As can be appreciated, these two types of DRAM devices have differing timing and control signal generation requirements which generally preclude conventional memory modules from operating with both types of devices. That is, conventional memory modules are typically designed to work with one type of device or the other. In that DRAM devices are in great demand and adequate supplies of a given type of device are not always readily available it can be seen that a memory module having the ability to operate with more than one type of DRAM device without modification is a desirable feature.

SUMMARY OF THE INVENTION

The foregoing and other problems are overcome and other advantages are realized by a memory unit, constructed and operated in accordance with the invention, for storing information units and being interconnected during operation with a memory control unit. The memory unit includes a bus coupling the memory unit to the memory control unit by a plurality of signal lines. The memory unit further includes a latch for receiving and storing an address from the bus, a first memory plane for storing information units associated with an odd address, a second memory plane for storing information units associated with an even address, an input latch for receiving from the bus an information unit associated with a received address and output latches for storing, prior to transmission to the bus, a stored information unit associated with a received address. The memory unit further includes logic, responsive to a state of a first bus signal line, for enabling the output latches to (a) simultaneously transmit to the bus an information unit from both the first and the second memory planes, or (b) sequentially transmit to the bus an information unit from one of the memory planes followed by an information unit from the other one of the memory planes.

Each of the memory planes further has an associated counter for storing and incrementing a portion of a column address, the counters being responsive to a bus signal asserted by the memory control unit. Up to 256 double-word write accesses or up to 128 quad-word read accesses can be achieved by supplying an initial address and thereafter toggling the bus signal to increment the counters. For page mode type of DRAMs toggling the bus signal also results in a deassertion and a reassertion of the CAS signal. For static column type of DRAMs the transition of the address counter outputs is sufficient to cause the DRAMs to begin a new access cycle.

The memory unit of the invention furthermore provides status signals to the memory control unit including a match signal to indicate that a particular memory unit lies within a range of addresses associated with a provided address and a signal which indicates, when asserted, that static column type of DRAMs are installed upon the memory unit asserting the match signal.

Further in accordance with this invention there is provided a memory control unit coupled during use to a system bus for receiving memory addresses therefrom. The memory control unit is further coupled during use to one or more memory units by a second bus that includes a plurality of signal lines for transmitting, during a memory access cycle, a memory address to the one or more memory units. Each of the one or more memory units includes a plurality of semiconductor memory devices having a plurality of addressable memory storage locations. The memory control unit further includes circuitry that is coupled to and responsive to a signal asserted on the second bus by one of the memory units selected by the transmitted memory address. The asserted signal indicates an access speed of the selected memory unit, and specifies a duration of the memory access on an access-by-access basis so as to make a duration of the memory access cycle compatible with the access speed of at least the semiconductor memory devices of the selected memory unit.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
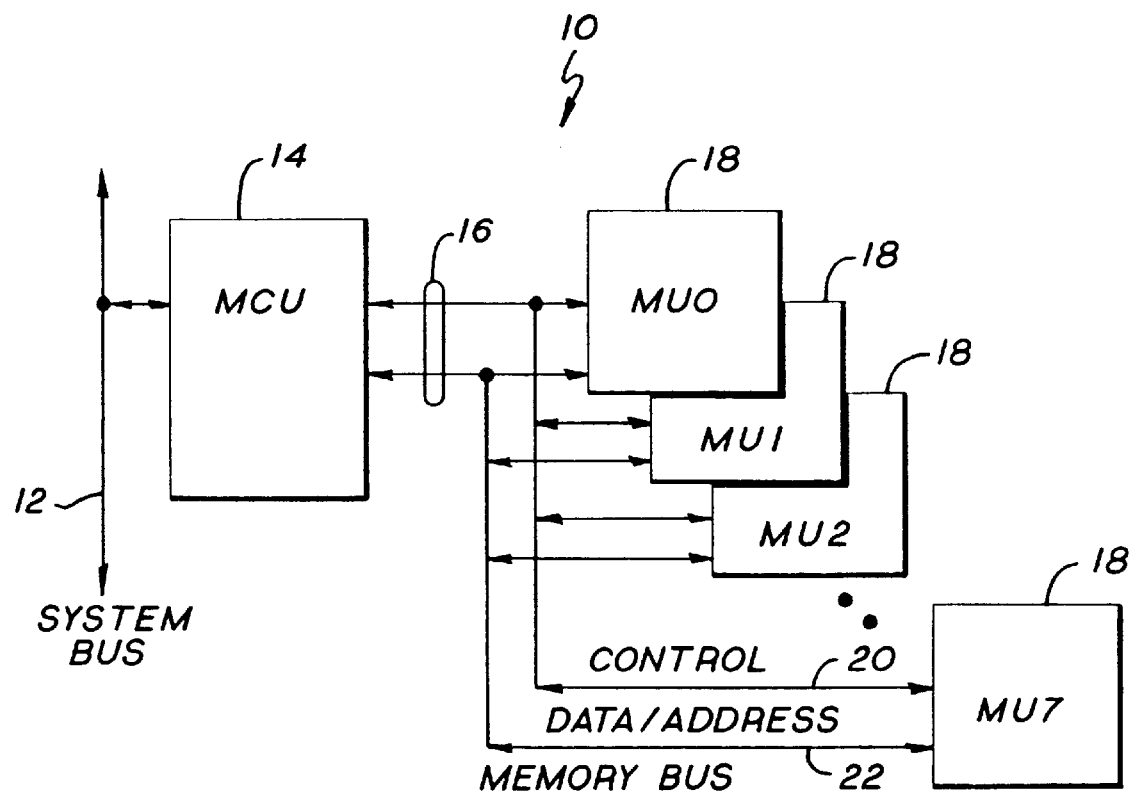
FIG. 1 is a block diagram of a portion of an information processing system showing a MCU coupled to a number of MUs via a MEMBUS.

Referring first to FIG. 1 there is shown in block diagram form a portion of an information processing system 10. System 10 includes a system bus 12 which couples together a number of bus connections including a memory control unit (MCU) 14. Other bus connections, such as a CPU (not shown) provide data to the MCU 14 to be written to memory and also receive data read from memory. Coupled to MCU 14 via a memory bus (MEMBUS) 16 are one or more memory units (MUs) 18. For example, in the illustrated embodiment up to eight MUs 18 (MUO-MU7) can be coupled to the MCU 14 via the MEMBUS 16. MEMBUS 16 can be seen to comprise two groups of signal lines including a control bus 20 and a data/address bus 22.

Figure 2A:
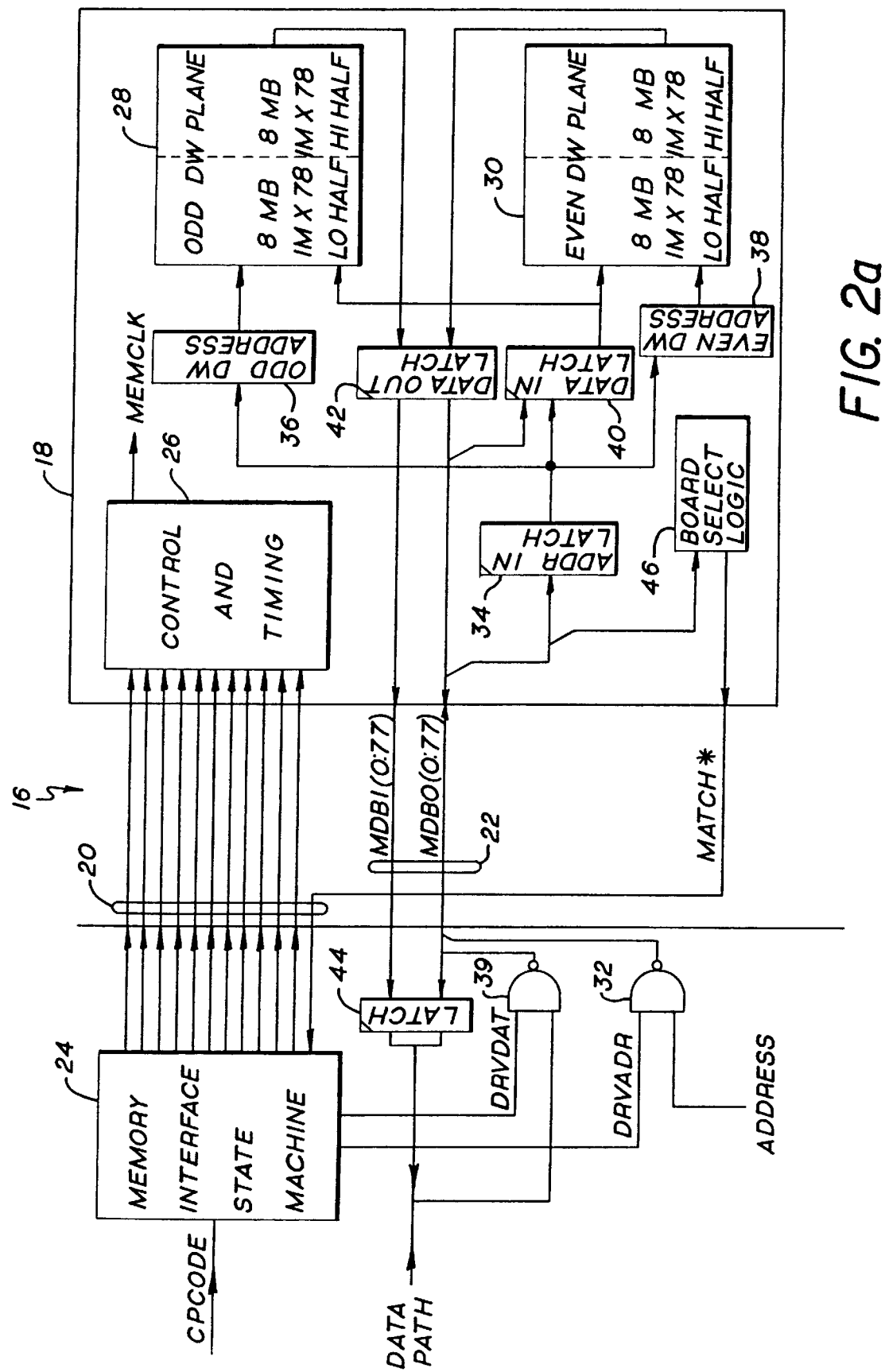
FIG. 2a shows in greater detail one embodiment of the MEMBUS of FIG. 1.

Referring to FIG. 2a there is shown the memory bus 16 in greater detail. The control bus 20 can be seen to comprise a plurality of signal lines which are sourced by, for example, a memory interface state machine 24 on the MCU 14. The memory interface state machine 24 is responsive to a memory access type opcode which is generated by a bus connection and which is sent over the system bus 12 to the MCU 14. The opcode defines a particular type of memory access such as a double-word read, a quad-word read, or a word or double-word write. The memory interface state machine 24 decodes the opcode and provides the necessary sequence of control signals to the MUs 18. A control and timing logic block 26 on the MU 18 receives the control bus 20 signals and, in synchronism with a memory clock (MEMCLK), generates a plurality of internal timing signals for the MU 18. The MU 18 can be further seen to include an odd double-word memory plane 28 and an even double-word memory plane 30. Planes 28 and 30 are each comprised of a plurality of memory devices which are preferably DRAMS. In the illustrated embodiment each of the planes 28 and 30 is differentiated into an upper and a lower half, each half having eight megabytes of storage organized as one megabyte by 78 bits. Sixty-four of the bits comprise a data double-word and the remaining 14 bits are error detection and correction (ECC) syndrome bits. A memory address is provided to the planes 28 and 30 from the MCU 14 via a memory address driver 32 which is controlled by a drive address (DRVADR) signal generated by the memory interface state machine 24. It should be noted that in this embodiment of the invention that the address bits are time multiplexed with a portion of the data bus 22. The address is latched in the MU 18 by an address input latch 34 and is provided to two address logic blocks 36 and 38, block 36 being associated with the odd double-word plane 28 and block 38 being associated with the even double-word plane 30. At a subsequent time in the memory access cycle the memory interface state machine 24, for a write type of memory access, generates a drive data signal (DRVDAT) which drives, via a driver 39, the contents of an internal data path to the MEMBUS data/address bus 22. It should be noted that for the illustrated embodiment of the invention that a single write cycle may be up to 64 data bits (double-word) in width (plus ECC syndrome bits) while a single read access cycle may be up to 128 bits (quad-word) in width. During a write type of access the data driven to MDBO <00:77> is received by a data input latch 40 and is provided therefrom to one of the planes 28 and 30 while a write strobe (WSTB) signal is gated to the proper plane for writing. During a memory read type of access the data outputs from the planes 28 and/or 30 are provided to a data output latch 42 which drives the data/address bus 22. The data is received by a latch 44 on the MCU 14 and is provided therefrom to the internal MCU 14 data path. The MU 18 also includes a unit select logic block 46 which decodes a portion of the address input to determine whether a particular MU 18 is selected by (matches) the provided address. The unit select logic block 46 returns a signal MATCH* to the MCU 14 if a MATCH condition is detected.

Figure 2B:
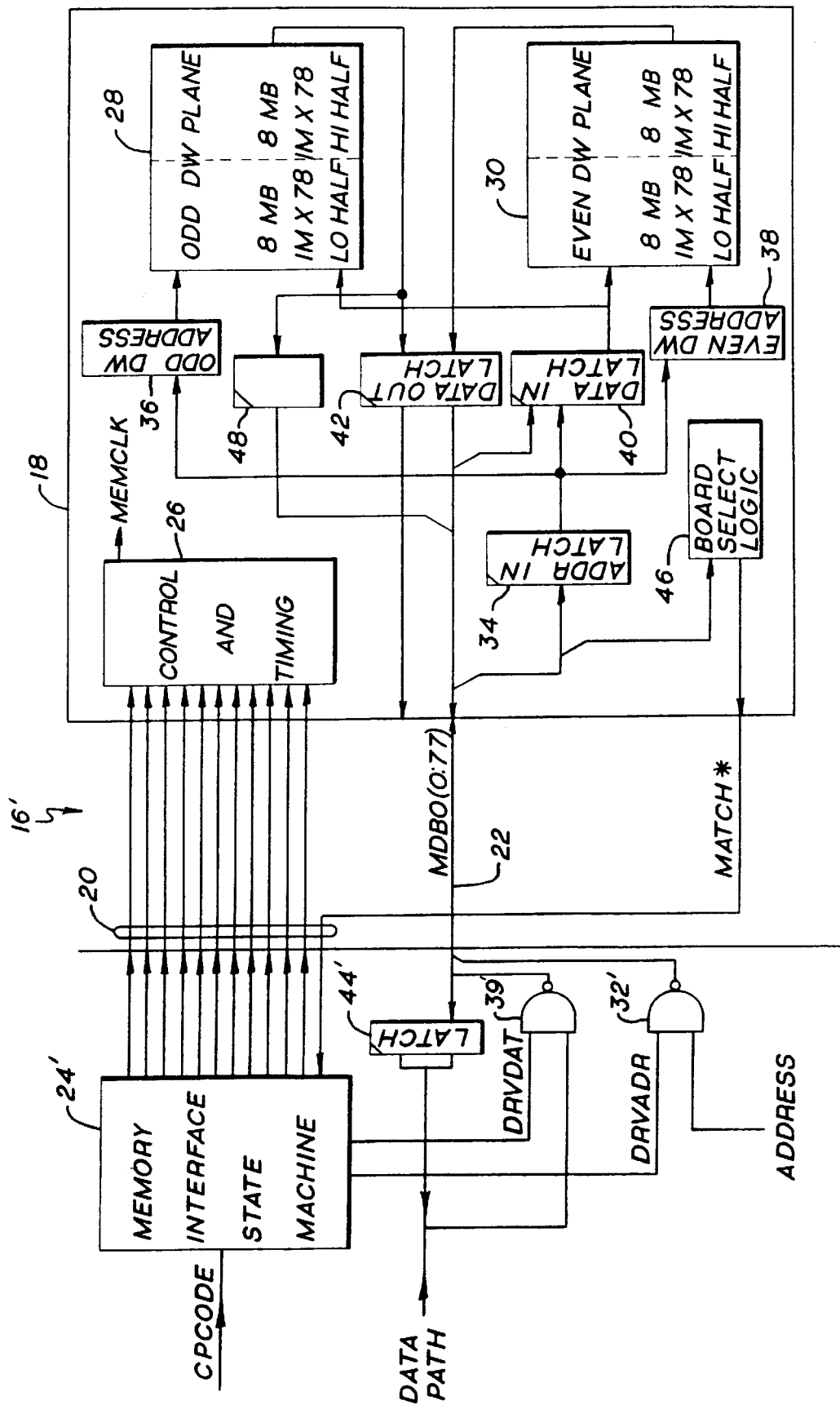
FIG. 2b shows in greater detail a second embodiment of the MEMBUS of FIG. 1.

FIG. 2b illustrates the MU 18 in use with a MCU 14' which employs a single 78-bit data/address bus 22. Thus, for this type of MCU 14' both the write and the read data paths are of equal width. In accordance with one aspect of the invention the MU 18 includes an additional data latch 48 which is employed to multiplex the data output of the odd double-word plane 28 onto the MDBO (00:77) bus 22. The operation of latch 48 is controlled by the control and timing block 26, as are the other latches and logic previously described, which in turn is responsive to particular ones of the control bus 20 signals as will be described.

It can be seen that the MU 18 provides either a first data bus width or a second data bus width which is twice that of the first width. Thus, the MU 18 can be employed with at least the two types of MCU 14 and 14' without requiring circuit changes to be made to the MU 18.

Figure 2C:
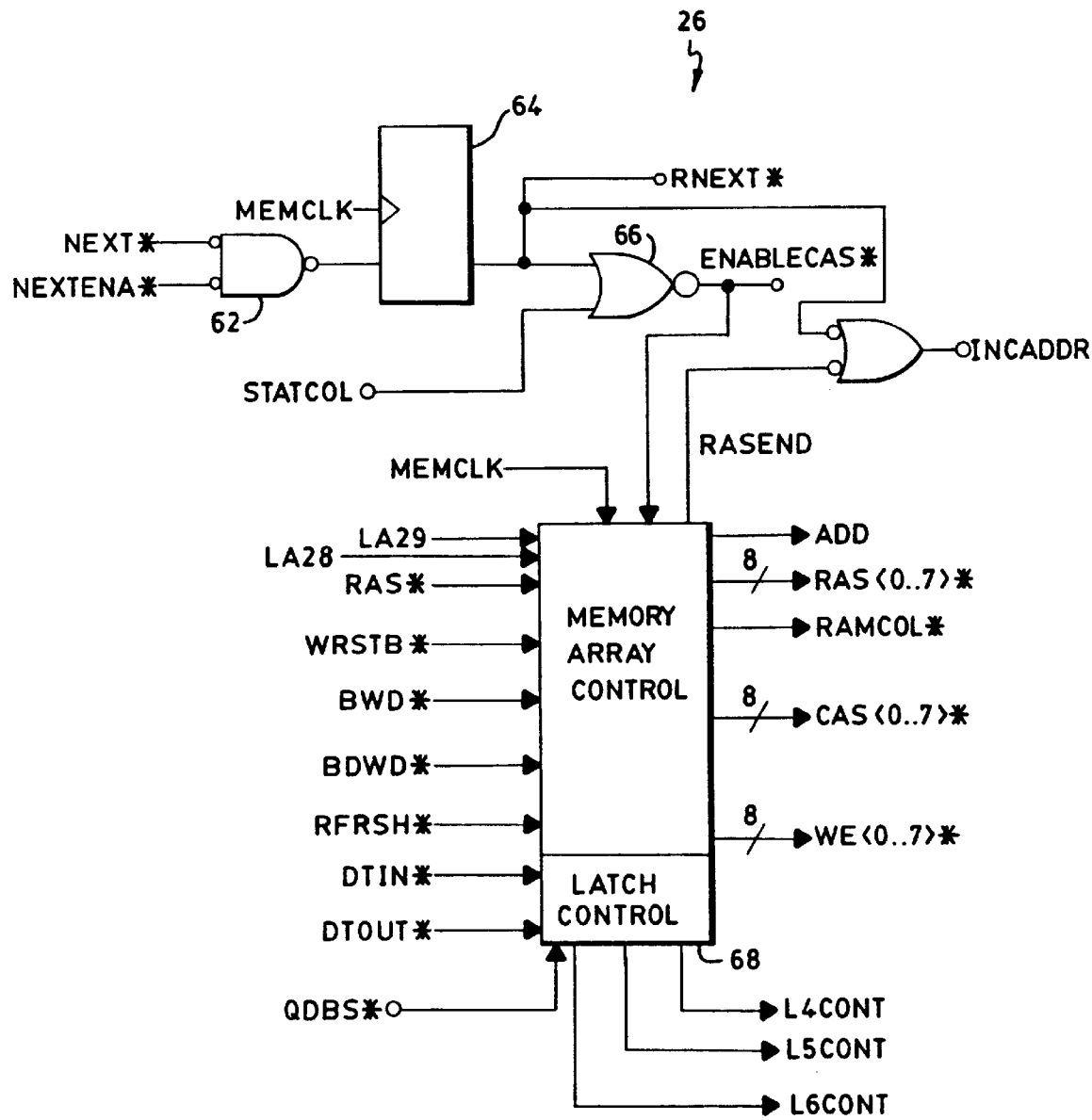
FIG. 2c is a block diagram partly in schematic form, which shows in greater detail the control and timing block 26.
Figure 3A:
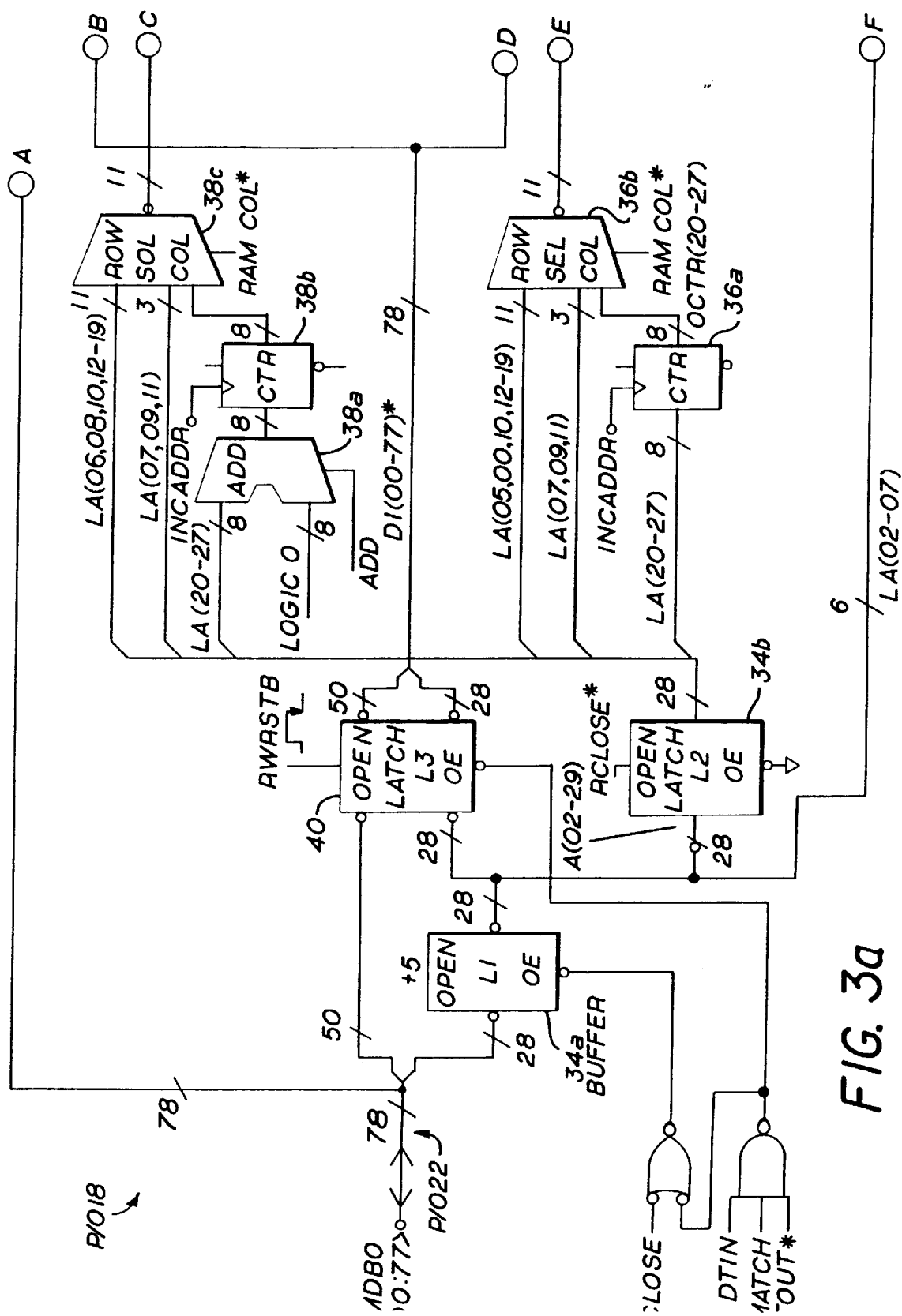
FIGS. 3a, 3b and 3c are each a portion of a simplified block diagram of the MU of the invention.
Figure 3B:
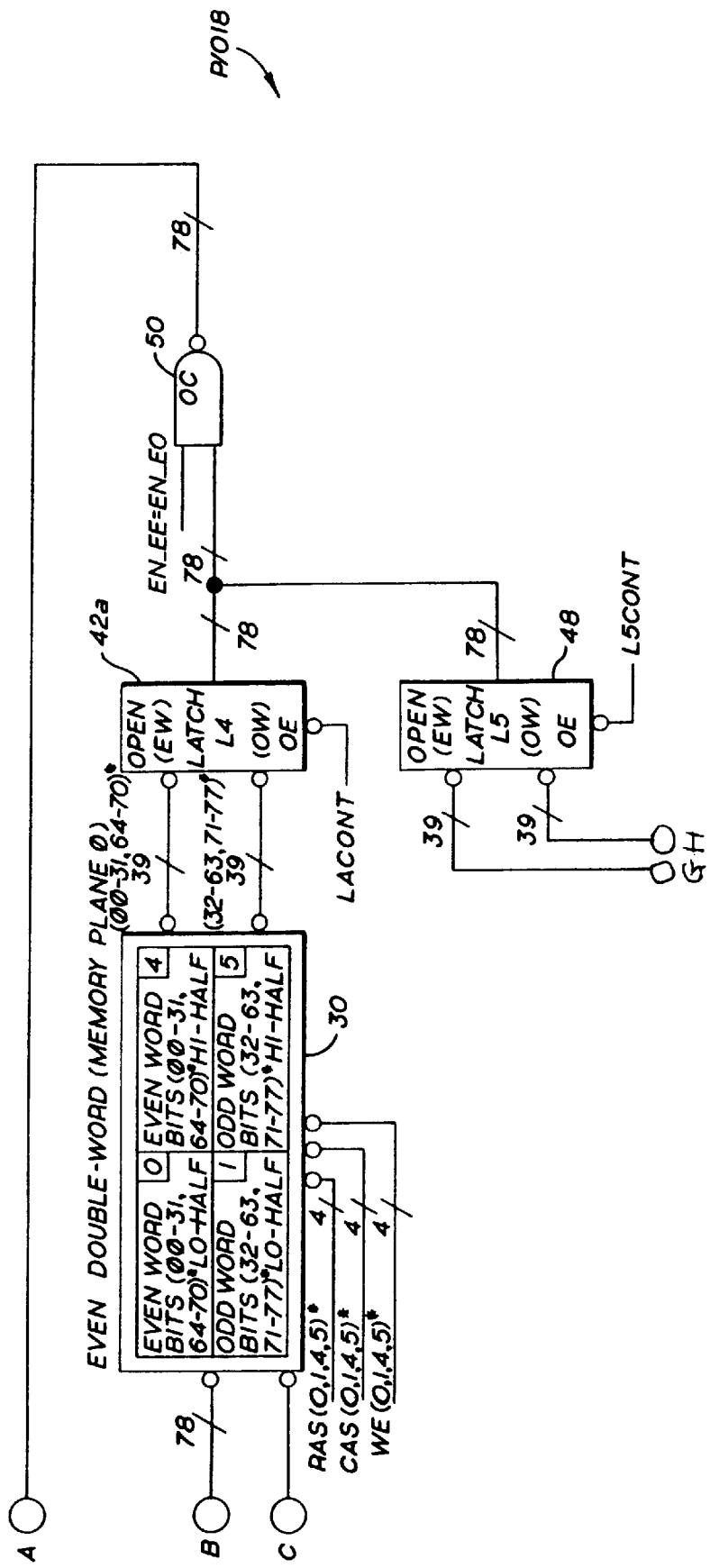
Figure 3C:
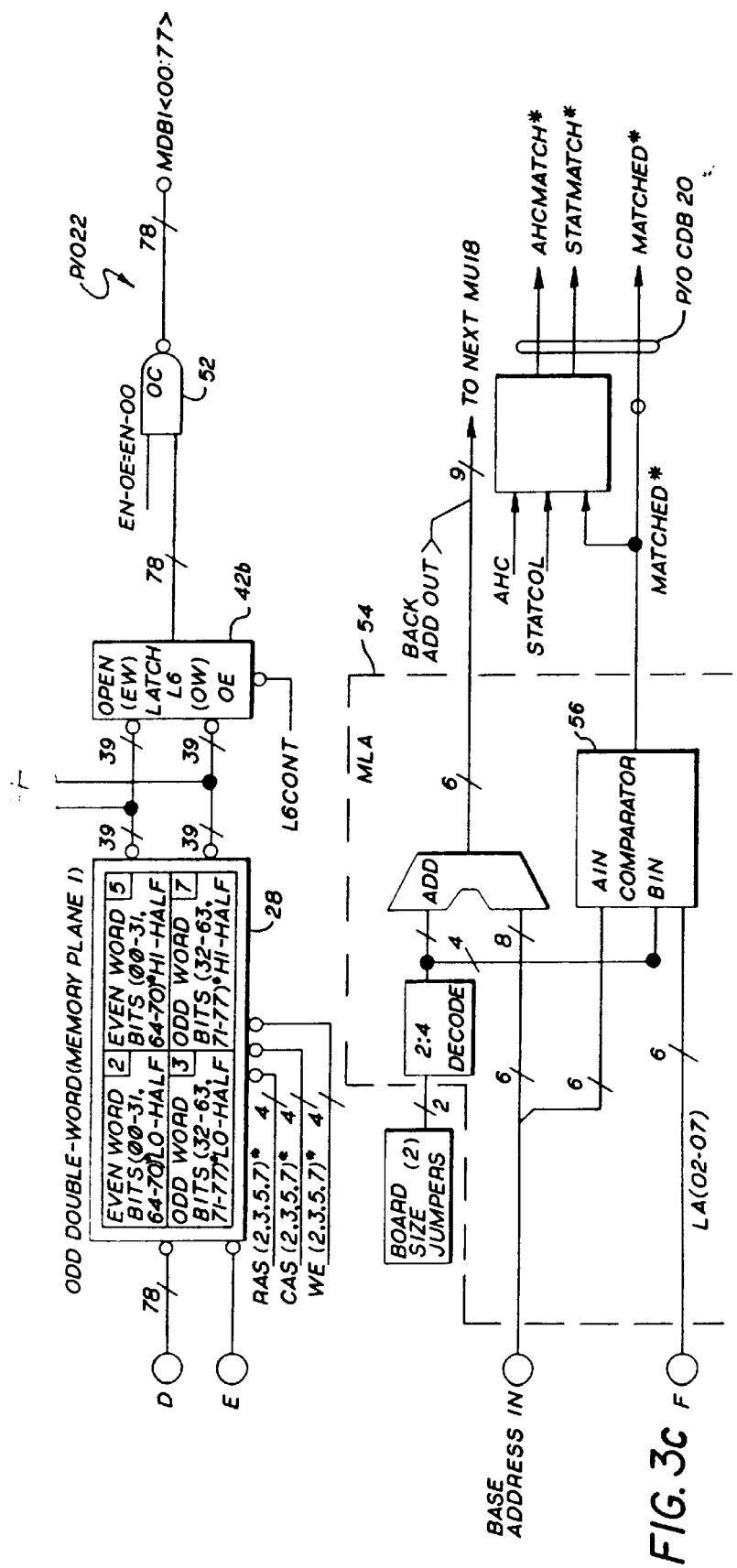
Figure 3:
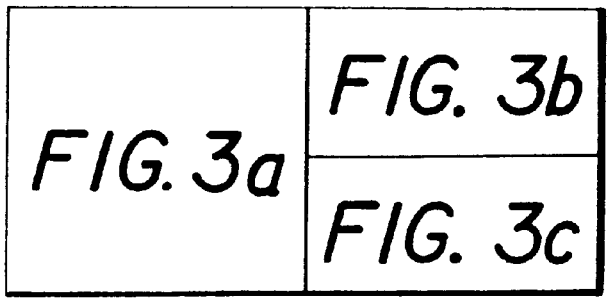
FIG. 3 shows the relative orientation of FIGS. 3a, 3b and 3c.

Referring now to the block diagrams of FIGS. 2c, 3b and 3c there is shown the MU 18 in greater detail. Specifically there is shown in FIG. 2c the control and timing block 26 in greater detail and in FIGS. 3a and 3b the internal address and data paths and also the board address match logic. In FIG. 3a it can be seen the MDBO <00:77> bus is coupled to the address input latch 34 which can further be seen is comprised of a buffer 34a and latch 34b. During the address portion of the memory bus cycle 28 bits of address are applied on the MDBO signal lines and are latched by latch 34b for application to the even double-word address logic 38 and the odd double-word address logic 36. The odd double-word address logic 36 can be seen to include a counter 36a and a row and column select multiplexer 36b. The even double-word address logic 38 is comprised of an adder 38a, a counter 38b and a row and column select logic 38c. Counters 36a and 38b are each an eight-bit counter which are preloaded with eight bits of the latched column address (LA(20–27)). Counters 36a and 38b each have an input (INCADDR) for incrementing the counter value by a value of one for accessing consecutive double-words from their respective memory planes. The adder 38 is provided for initially preincrementing the even double-word column address by a value of one when an ADD signal, LA 28=1, is asserted. This preincrement is accomplished when a starting memory address begins from the odd double-word plane. It should be noted that two bits of the latched address (LA28 and LA29) are not applied directly to the memories. Bit 29 is applied to the control block 26 and selects within a memory plane the even or odd word while bit 28 is employed for selecting either the even or the odd memory planes 28 and 30 for access.

By example, and assuming that an initial address refers to the even word plane, LA<26–29> may equal $0100_2$. This results in the least significant four bits of each of the counters 36a and 38b being loaded with a value of $0001_{(2)}$, it being remembered that bits LA 28 and 29 are not applied to the counters. Thus, both planes 28 and 30 are provided with an address having LSBs of $0001_{(2)}$. If the access is a multiple quad-word read access, both planes retrieve data from the provided address. After a first memory read access the counters 36a and 38b are both incremented by the assertion of INCADDR such that both have a value of $0010_{(2)}$ for accessing the next consecutive double-word.

However, if LA28 of the initial address points to the odd double-word plane 28, such as an address of $0110_{(2)}$, both counters will again have an initial value of $0001_{(2)}$. In this case of starting an access from the odd double-word plane, the adder 38a first adds a one to the even memory plane 30 column address before the address is stored in counter 38b such that the even double-word plane counter 38b does not fall behind the odd plane counter 36a. That is, the odd double-word plane is accessed at address $0001_{(2)}$ while the even double-word plane is initially accessed at address $0010_{(2)}$. After incrementing both counters 36a and 38b the next odd plane address from counter 36a is 0010 while the next even plane address from counter 38b is $0011_{(2)}$.

The multiplexers 36b and 38c each apply two sets of 11 bits of address to the DRAM double-word memory planes 28 and 30 which, in conjunction with the appropriate RAS* and CAS* signals, are strobed into the memories for selecting a particular address location. The assertion of the RAM COL* signal switches the output of multiplexers 36b and 38c from the row address to the column address provided by the counters 36a and 38b, respectively. It should be realized that ten of these eleven address bits are strobed directly into the one megabyte DRAMs and that in other embodiments of the invention that more or less than this number of bits are provided depending on the density of the individual memory devices. For example, if four megbyte DRAMs are employed all eleven of the address bits are used.

Data input latch 40 is employed during memory write cycles and is a 64 data bit, plus 14 ECC syndrome bit width latch, the outputs of which are applied to the data input terminals of the memory devices of the two memory planes 28 and 30.

Each of the double-word memory planes 28 and 30 has a data output latch associated therewith, namely the 78-bit latches L4 42a and L6 42b. Latches L4 42a and L6 42b are employed when the MU 18 is utilized with the MCU 14 of FIG. 2a for simultaneously providing up to 128 bits, or one quad-word of data, for memory read cycles. Each of the latches L4 42a and L6 42b has an associated 78-bit output driver 50 and 52, respectively, coupled to an output thereof for driving the MDB0 and MDB1 buses, respectively.

In accordance with one aspect of the invention the odd double-word memory plane 28 further has the 78-bit latch L5 48 coupled to its output, the latch 48 having an output coupled to the input of the even double-word memory plane driver 50. Thus, for those types of applications which employ a 64 bit, as opposed to a 128 bit, memory data bus the latch 48 is utilized to multiplex the output of the odd double-word memory plane 28 on to the MDBO<00:77> bus.

The MU 18 further includes a memory logic array (MLA) 54 which is utilized to determine if a particular bus address selects the MU 18 for a read or write cycle. A base address input is compared to a portion of the address from buffer 34a. If the address is determined to be within a range of addresses which correspond to a particular MU 18 an output of a comparator 56 asserts the MATCH* signal which is provided on the memory bus 16 to the MU 14. The MLA 54 further functions to provide a base address output to a next consecutive MU 18 in a manner which is disclosed in copending patent application serial No. 07/179,162, filed Apr. 8, 1988.

Figure 4:
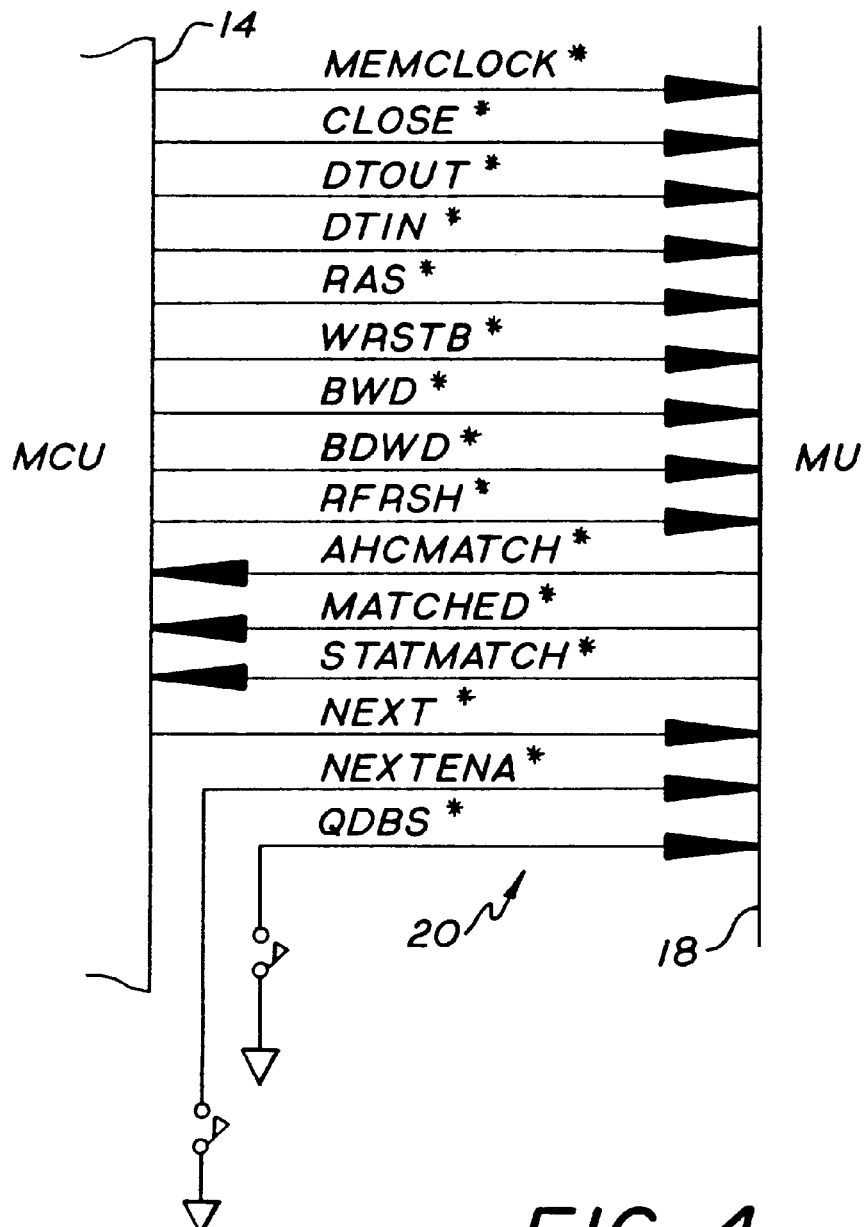
FIG. 4 shows in greater detail certain signals of the MU control bus which is a part of the MEMBUS.

FIG. 4 shows in greater detail the memory control bus 20 of FIG. 2a and FIG. 2b. The function of the various signals shown in FIG. 4 are better understood by also referring to the timing diagrams of FIGS. 5–12 which show a variety of memory access types.

Figure 5:
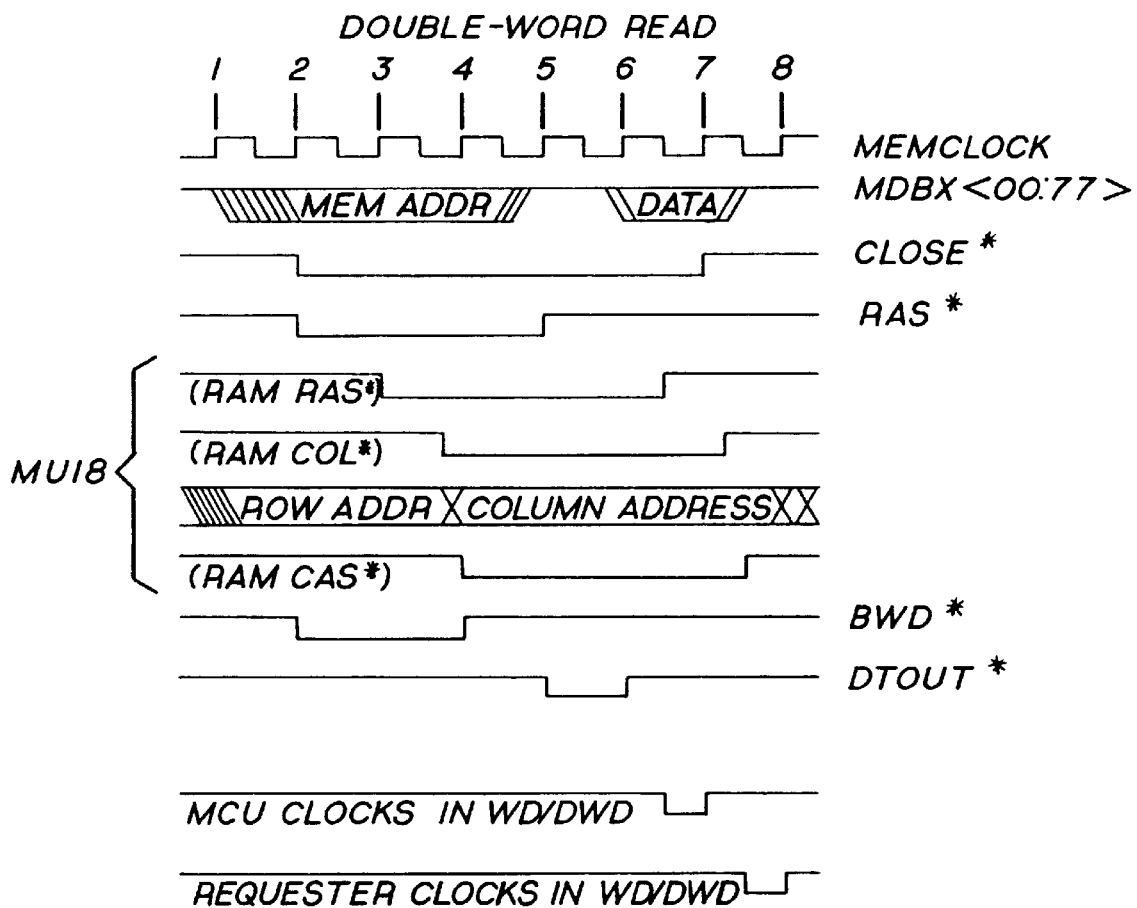
FIG. 5 shows the signal timing for a double-word MU read operation.

The MEMCLOCK* signal is provided from the MCU 14 to the MU 18 and establishes a reference clock signal for the MU 18. The CLOSE* signal captures and latches the address appearing on MDB0<02:31> at the beginning of a memory operation. As can be seen in FIG. 5, the CLOSE signal is asserted when the memory address is set up on MDB0 at the beginning of a memory access cycle. CLOSE remains asserted until the end of the memory access cycle. DTOUT* and DTIN* are provided from the MCU 14 and convey a four bit code to the MU 18. The four bit code provided by the DTOUT* and DTIN* signals are employed during read and write operations and is used by the MU 18 to enable the MU 18 buffers and other circuitry for writing to the MU 18 or for reading from the MU 18. Table 1 illustrates the use of DTOUT* and DTIN* in conjunction with other signals.

TABLE 1

DESCRIPTION OF DTOUT* AND DTIN*

| DTOUT* | DTIN* | QDBS* | BDWD* | LA28 | |
|---|---|---|---|---|---|
| 0 | X | 0 | 1 | 0 | Enables latch & driver outputs (42a & 50) to send data to MCU for memory reads |
| 0 | X | 0 | 1 | 1 | Enables latch & driver outputs (42b & 52) to send read data to MCU for memory reads |
| 0 | X | 0 | 0 | X | Enables latch & driver outputs (42a & 50 & 42b & 52) to send read data to MCU for memory reads |
| 0 | 0 | 1 | X | X | Enables latch & driver outputs (48 & 50) to send read data to MCU for memory reads |
| 0 | 1 | 1 | X | X | Enables latch & driver outputs (42a & 50) to send read data to MCU for memory reads |
| 1 | 0 | X | X | X | Enables buffer & latch outputs (34a & 40) to drive data into MU array for writes |
| 1 | 1 | X | X | X | No buffer or latch outputs enabled |

Figure 8:
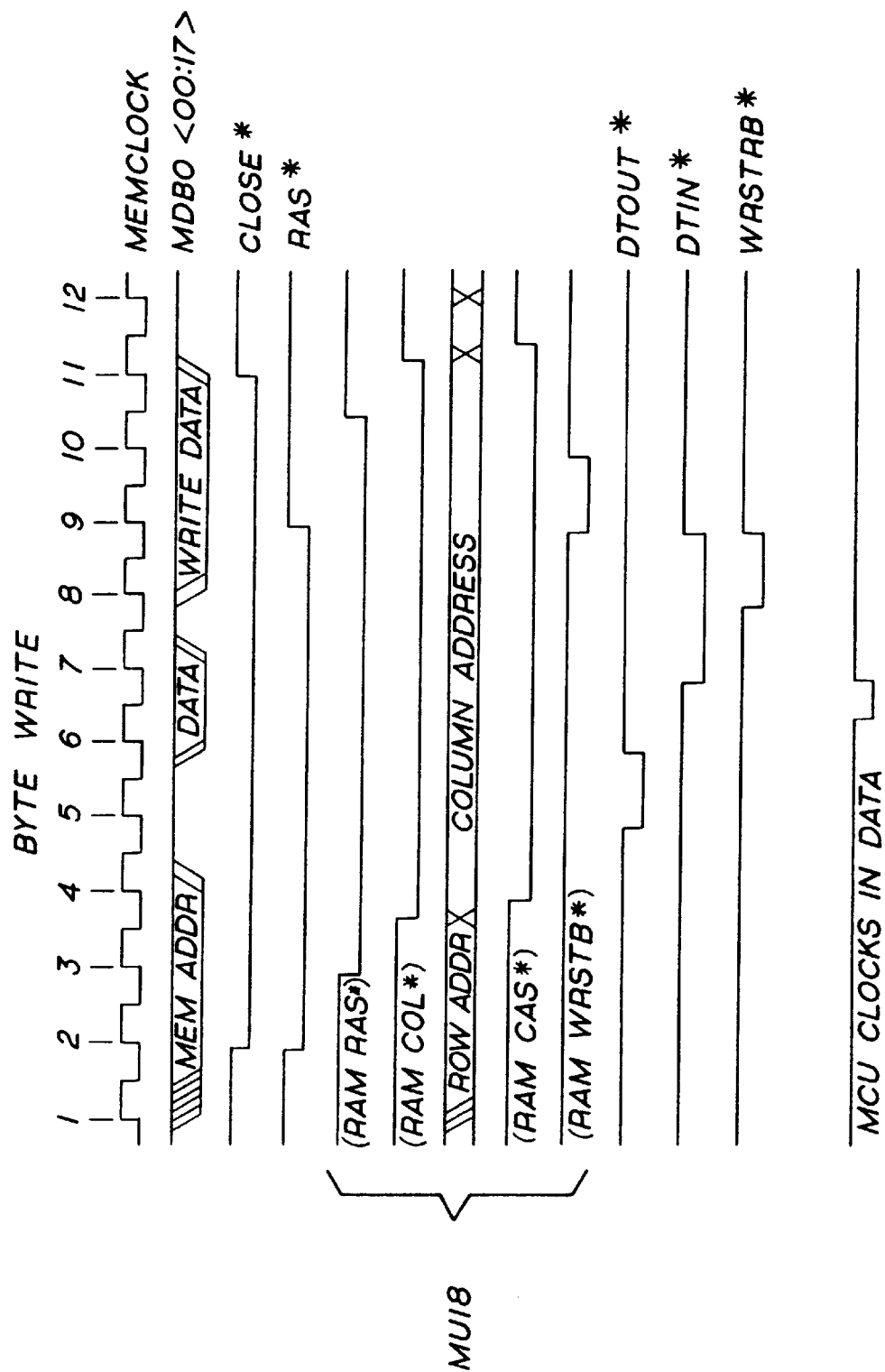
FIG. 8 shows the signal timing for a byte write operation.

The row address strobe (RAS*) signal is generated by the MCU 14 and is provided via the control and timing block 26 to the memory devices on the MU 18 to strobe in the row address provided from the multiplexers 36b and 38c. The column address strobe (CAS*) is generated by the MU 18 for both read and write access cycles. It should be noted that if the memory unit has static column type DRAMs that CAS* remains asserted during multiple memory access cycles. A write strobe (WRSTB*) is generated by the MCU 14 for write-type access cycles and is provided, as can be seen in FIG. 8, substantially coincidentally with the provision of write data on the memory bus 16.

The control bus 20 includes a BWD* signal and a BDWD* signal. As can be seen in FIGS. 5–12, the BWD* signal is utilized for all memory accesses of a double-word or greater in width. The BDWD* signal is used for all memory accesses which are a quad-word in width. BDW* and BDWD* control, via the control and timing block 26, which of the memory planes 28 and 30 receive RAS*, CAS* and WRSTRB*. For a byte or word write cycle (FIGS. 8 and 9) neither BDW* or BDWD* is generated, the memory plane section being accomplished by LA<29>. For a double-word operation LA<29> is ignored and BDW* and LA<28> control the memory plane selection. For an operation greater than a double-word, LA 29 and LA 28 are ignored and BWD* and BDWD* control memory plane selection. For this case LA 28 controls the proper sequencing of the planes.

Figure 11:
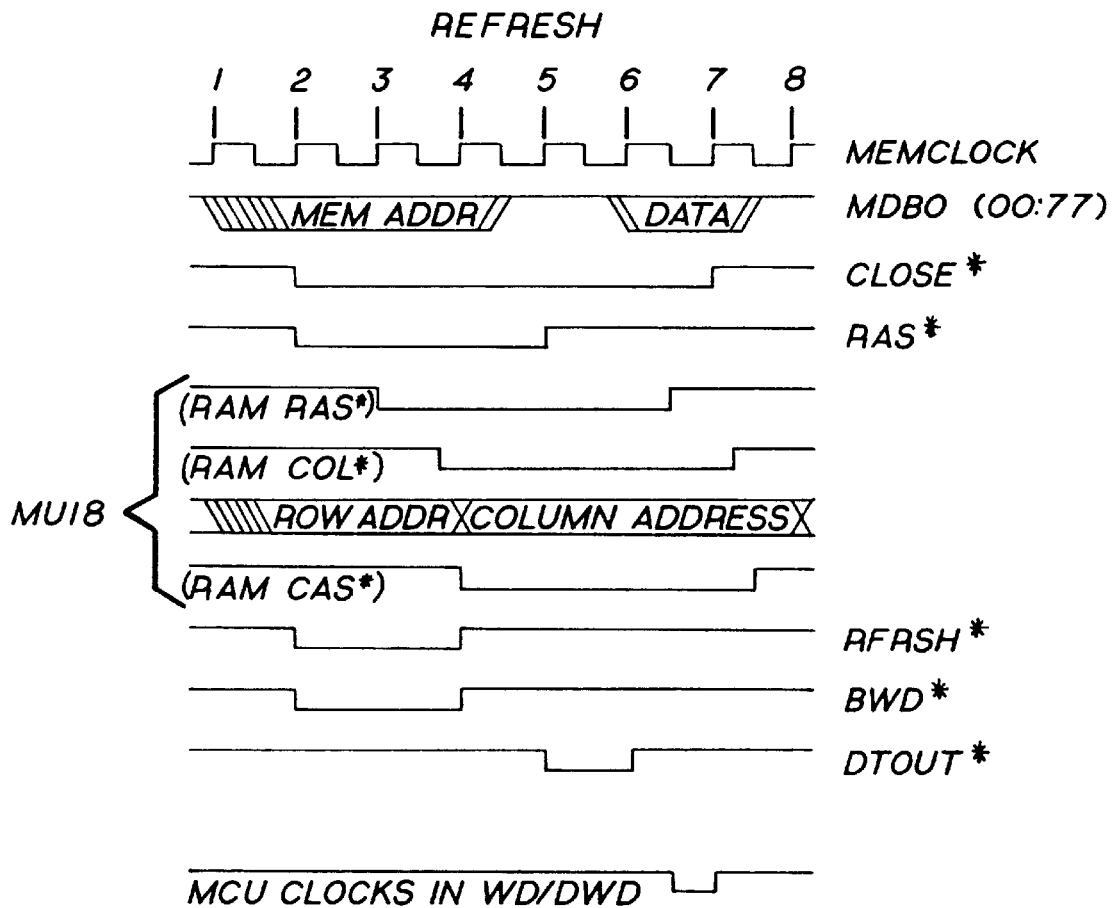
FIG. 11 shows the signal timing for a refresh operation.
Figure 12:
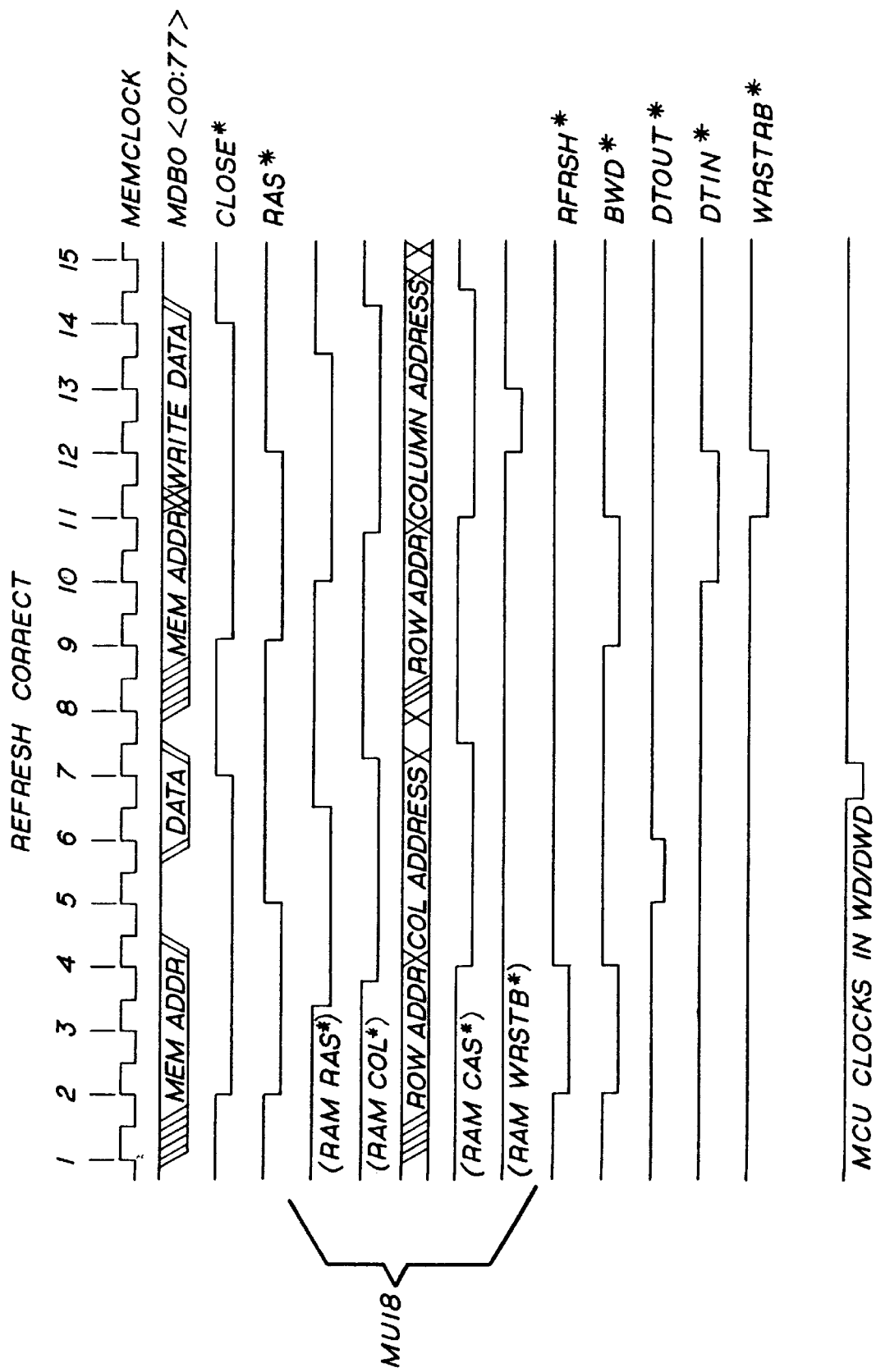
FIG. 12 shows the signal timing for a refresh operation including a correction.

A refresh (RFRSH*) signal is periodically generated by the MCU 14 in order to initiate a refresh cycle on the MU 18. As can be seen in FIG. 11, the refresh cycle is performed as a read operation, having both RAS* and CAS* asserted, which enables the MCU 14 to read the data at the refresh location and to perform error "sniffing" and correction if necessary. In FIG. 12 it can be seen that the refresh cycle indicated a bit in error and that corrected data is written back to the MU 18 during the time that the WSTRB* signal is asserted.

The MATCHED* signal is returned to the MCU 14 only by the MU 18 which generates a matched condition with the MCU 14 provided address. Furthermore, a STATMATCH* signal is provided back the MCU 14 simultaneously with the provision of the MATCHED* signal only for those MU 18s which employ static column DRAMs. The STATMATCH* signal can be utilized by the MCU 14 to modify its internal timing in that the STATMATCH* signal being asserted generally indicates that a faster memory access is possible.

The AHCMATCH* signal is output from the matched MU to the MCU 14; the assertion of AHCMATCH* being caused by the generation of MATCHED* and also a MU jumper or switch which indicates that DRAMs having a specified speed are installed. AHCMATCH* is a status signal to the MCU 14 which indicates that the MU is adding one half of a MEMCLK cycle to the memory access to accommodate the timing requirements of the DRAMs. For example, if faster access DRAMs are installed the jumper may not be set and AHCMATCH* is therefore not asserted.

As was previously discussed, page mode DRAMs are characterized as requiring multiple assertion of CAS* in order to accomplish consecutive memory accesses. In accordance with one aspect of the invention the NEXT* signal is utilized for page mode DRAMs in order to cause successive assertions of the CAS* signal. It should be remembered that the counters 38b and 36a can also be incremented by NEXT* between accesses in order to increment the column address. Therefore, the assertion of the NEXT* signal is employed for multiple read and write type of accesses for page mode DRAMs as well as for static-column DRAMs. However, the assertion of NEXT*, for static column DRAMs, increments the address but does not affect CAS*.

The Next Enable (NEXTENA*) signal is employed, when asserted, to enable the gating of the NEXT* signal onto the MU 18. The NEXTENA* signal can be hard wired on the control bus 20 to either an enabling or a disabling logic state. The assertion of NEXTENA* indicates that the MU 18 is coupled to an MCU which generates the signal NEXT* to perform multiple memory accesses.

Further in accordance with the invention there is provided a quad data bus (QDBS*) signal which specifies to the MU 18 whether the MEMBUS 16 is a double-word (64 bit) or a quad-word (128 bit) type bus. As with the NEXTENA* signal the QDBS* signal can be tied to a logic signal on the MEMBUS 16. When the QDBS* signal is asserted the MU 18 is notified that it is installed in a quad-word bus type of system. When the QDBS* signal is not asserted the MU 18 is notified that it is installed in a double-word bus type of system and that latch L5 48 is required to multiplex the odd double-word plane 28 output onto the MDBO bus.

Figure 13A:
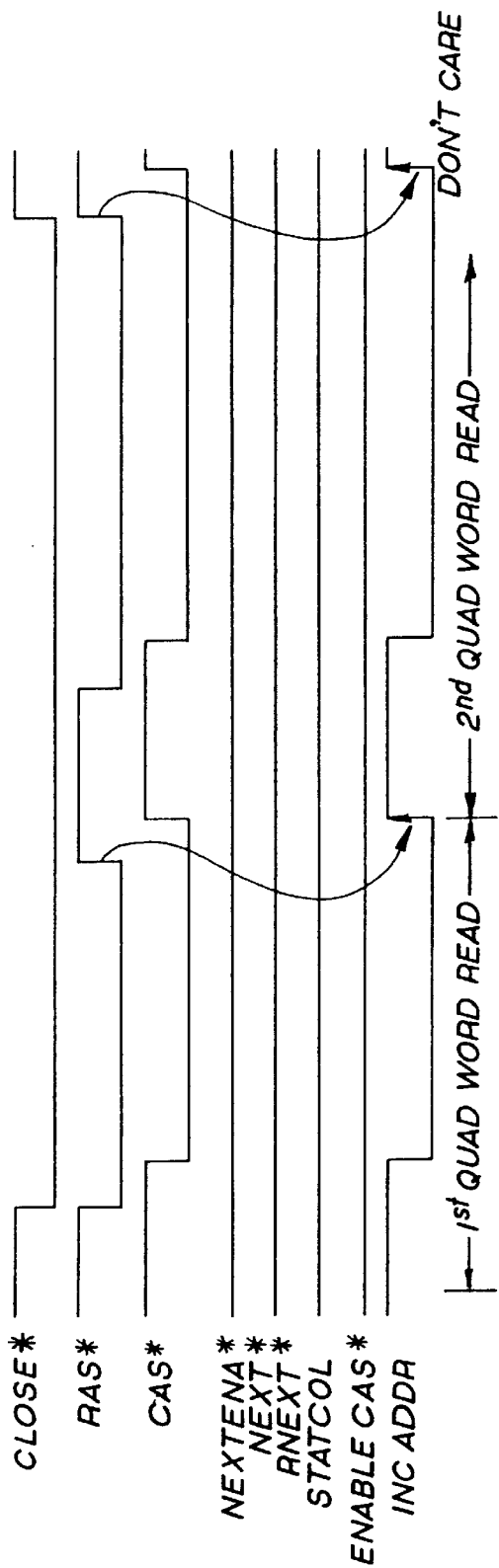
FIGS. 13a, 13b and 13c are timing diagrams which illustrate the operation of certain signal lines in different configurations of systems.
Figure 13B:
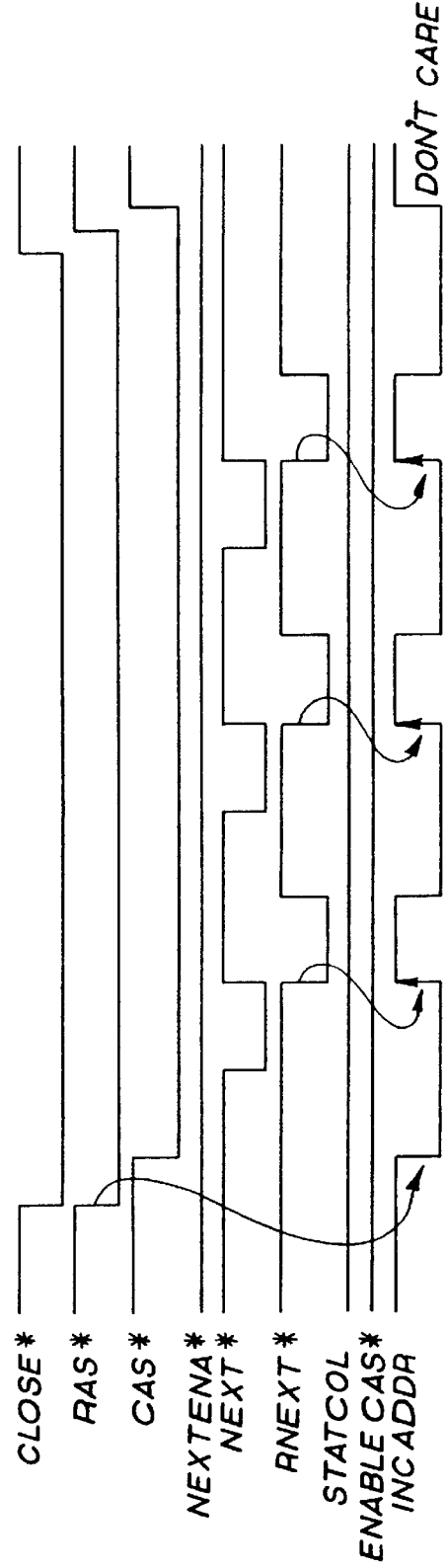
Figure 13C:
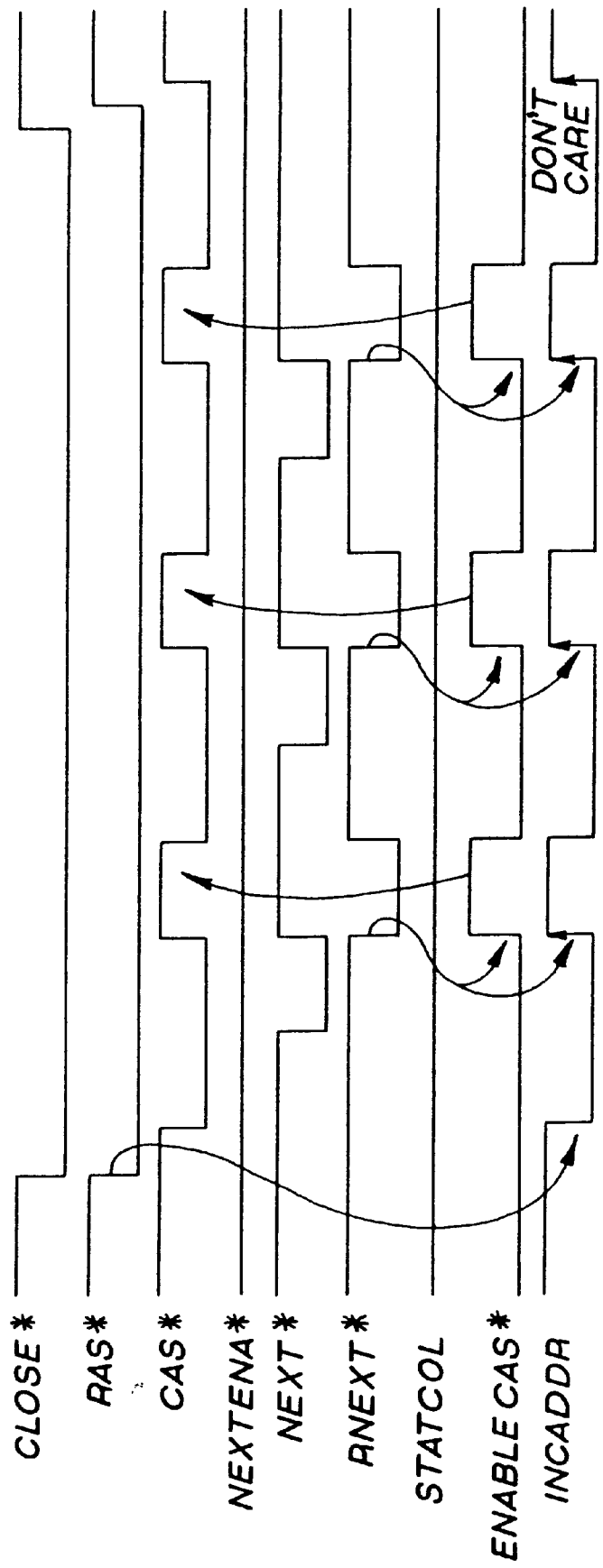

As can be seen in FIG. 2c the NEXTENA* signal enables the generation of an ENABLECAS* signal via gate 62, F/F 64 and gate 66. The output of F/F 64 is a registered NEXT* (RNEXT*) signal. The ENABLECAS* signal is asserted when NEXT* is asserted by the MCU 14 in conjunction with the NEXTENA* signal and also when the MU 18 provides a signal STATCOL which indicates that static column DRAMS are not installed. The ENABLECAS* signal is provided to a Memory Array Control (MAC) block 68 for enabling the assertion of certain CAS<0:7> signals to the memory planes 28 and 30. If STATCOL indicates that static column DRAMs are installed ENABLECAS* is generated and the transitions of the address inputs to the DRAMs, provided from counters 36a and 38b via multiplexers 36b and 38c, provide the required DRAM activation to access a next column address. The assertion of RAS* by the MCU 14 further initiates the assertion of certain ones of the RAS<0:7>* memory strobes which initiate the memory access cycle. At the end of a particular RAS* cycle a signal RASEND is asserted by MAC 68 to gate 70 which, regardless of the state of ENABLECAS*, generates the INCADDR signal to counters 36a and 38b. If NEXTENA* is asserted the INCADDR signal is generated from RNXT*. FIGS. 13a, 13b and 13c are timing diagrams which illustrate the operation of these signal lines in different configurations of systems. Specifically, FIG. 13a shows a double-word width data bus system having page mode DRAMs and a maximum operation size of an octal-word read. FIG. 13b illustrates a quad-word width data bus system having static column DRAMs. FIG. 13c illustrates a quad-word width data bus system having page mode DRAMs. In these three FIGS. 13a–13c it should be noted that the terminal rising edge of the increment address (INCADDR) signal is a don't care state in that the operation has already ended.

MAC 68 includes a number of Control Bus 20 inputs including WRST*, BWD*, BDWD*, DTIN* and DTOUT*. The state of the se signals is decoded by the MAC 68 for generating the required ones of the memory strobe signals. A portion of the MAC68 is a Latch Control 72 which decodes certain of the input signals for generating various latch controlling outputs, including L4CONT, L5CONT and L6CONT. By example, if QDBS* is asserted then L5CONT is not generated, QDBS* indicating that the MU 18 is installed in a quad-word wide MEMBUS 16 system. Conversely, if QDBS* is not asserted then L5CONT is generated for multiplexing the odd double-word memory plane output to the even double-word bus, namely MDBO<00:77>. The MAC 68 also controls the generation of the ADD signal to adder 38a to initially add a one to the even double-word counter 38b as previously described.

It can be appreciated that inasmuch as counters 36a and 38b are both eight bit counters that the operation of Control Bus 20 in conjunction with Control and Timing block 26 enables up to 128 consecutive quad-word read cycles or up to 256 consecutive double-word write cycles. These consecutive read or write accesses are accomplished by providing the initial address and thereafter repetitively asserting the NEXT* signal from the MCU 14.

Referring to FIG. 5 there is shown the operation of the Control Bus 20 and certain MU 18 and MCU 14 signals for a double-word read cycle. The MEMCLOCK signal provides a reference clock, cycles of which are shown numbered consecutively. At the beginning of the read cycle the address from MCU 14 is stable at the rising edge of MEMCLOCK 2 and the CLOSE* and RAS* signals are asserted. The BWD* signal is also asserted for indicating that a double-word operation is in progress. A row address is provided by the appropriate multiplexer 36b or 38c and at rising edge of MEMCLOCK3 the row address is strobed into the DRAMs by the RAM RAS* signal. The multiplexer thereafter switches to the column address provided from the associated counter 36a or 38b and RAM CAS* is generated at MEMCLOCK4 for strobing into the addressed DRAMs the column address. At MEMCLOCK5 the MCU 14 asserts DTOUT* to enable output drivers etc., thereby enabling the MU 18 output data path, including the appropriate data latch. Data read from the addressed memory plane is driven to the appropriate MDB bus 22. During MEMCLOCK6 the MCU 14 latches the data and at the end of MEMCLOCK6 CLOSE* is deasserted, thereby terminating the MCU 14 access.

Figure 6:
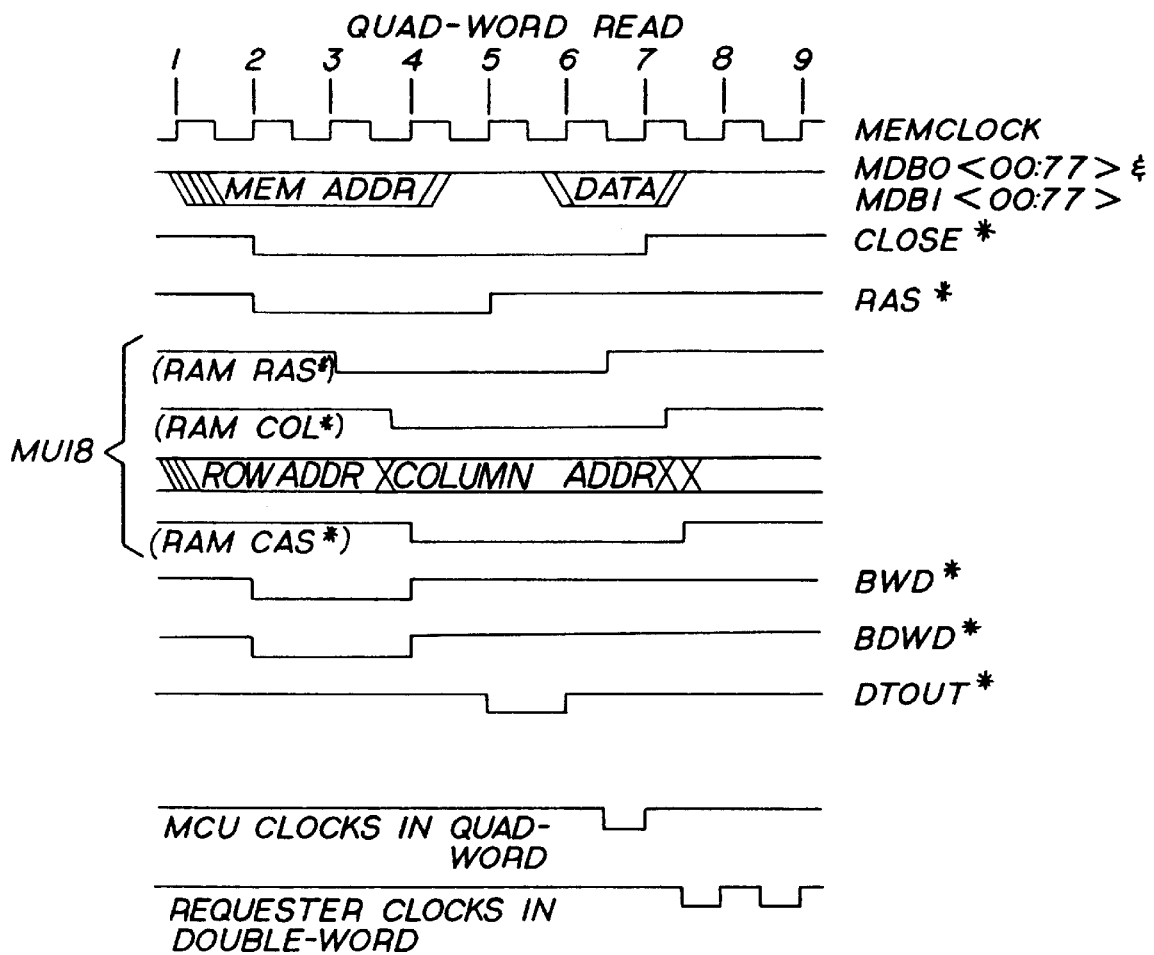
FIG. 6 shows the signal timing for a quad-word MU read operation.
Figure 6A:
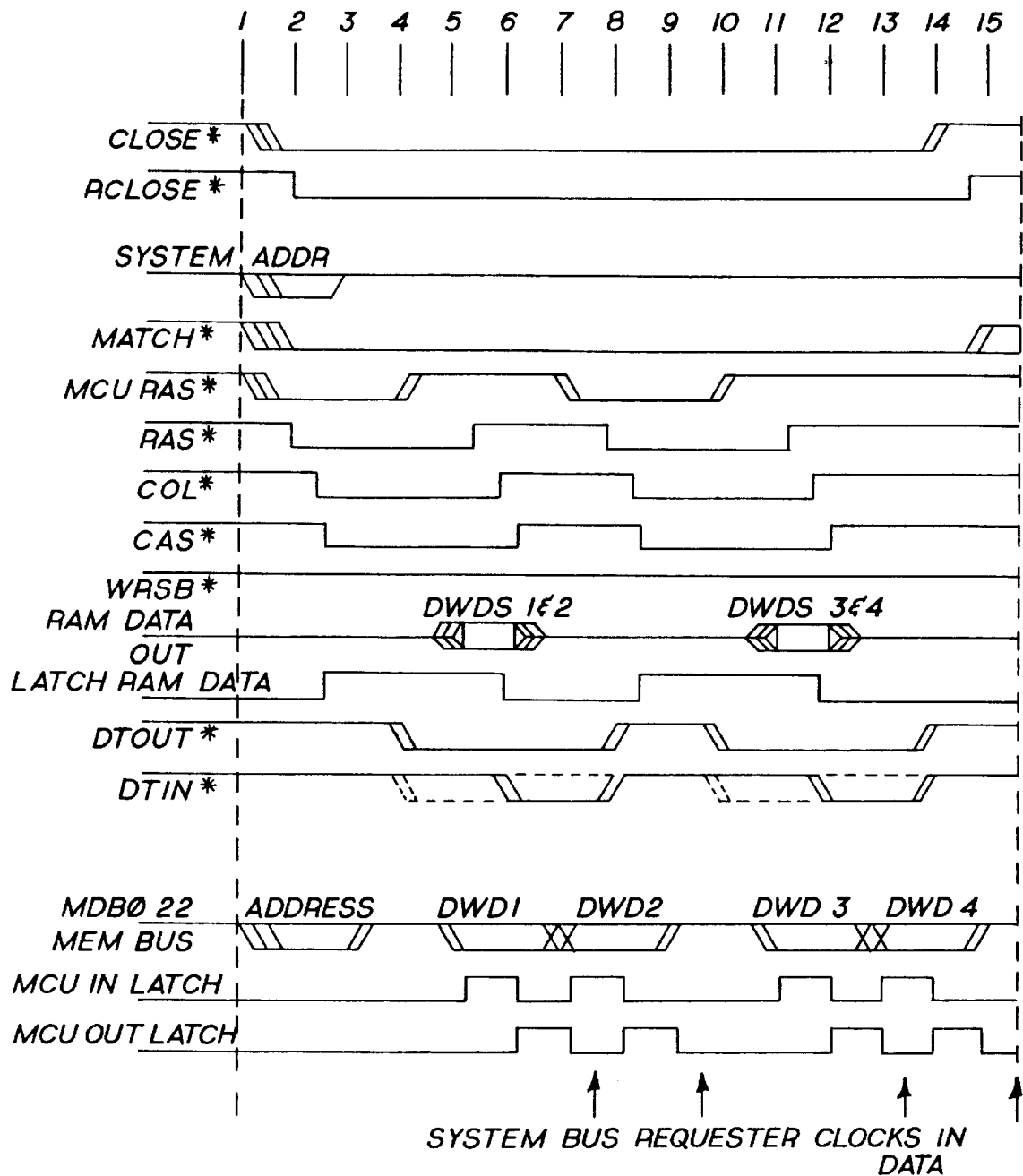
FIG. 6a shows an octal-word read cycle for a double-word width system.
Figure 6B:
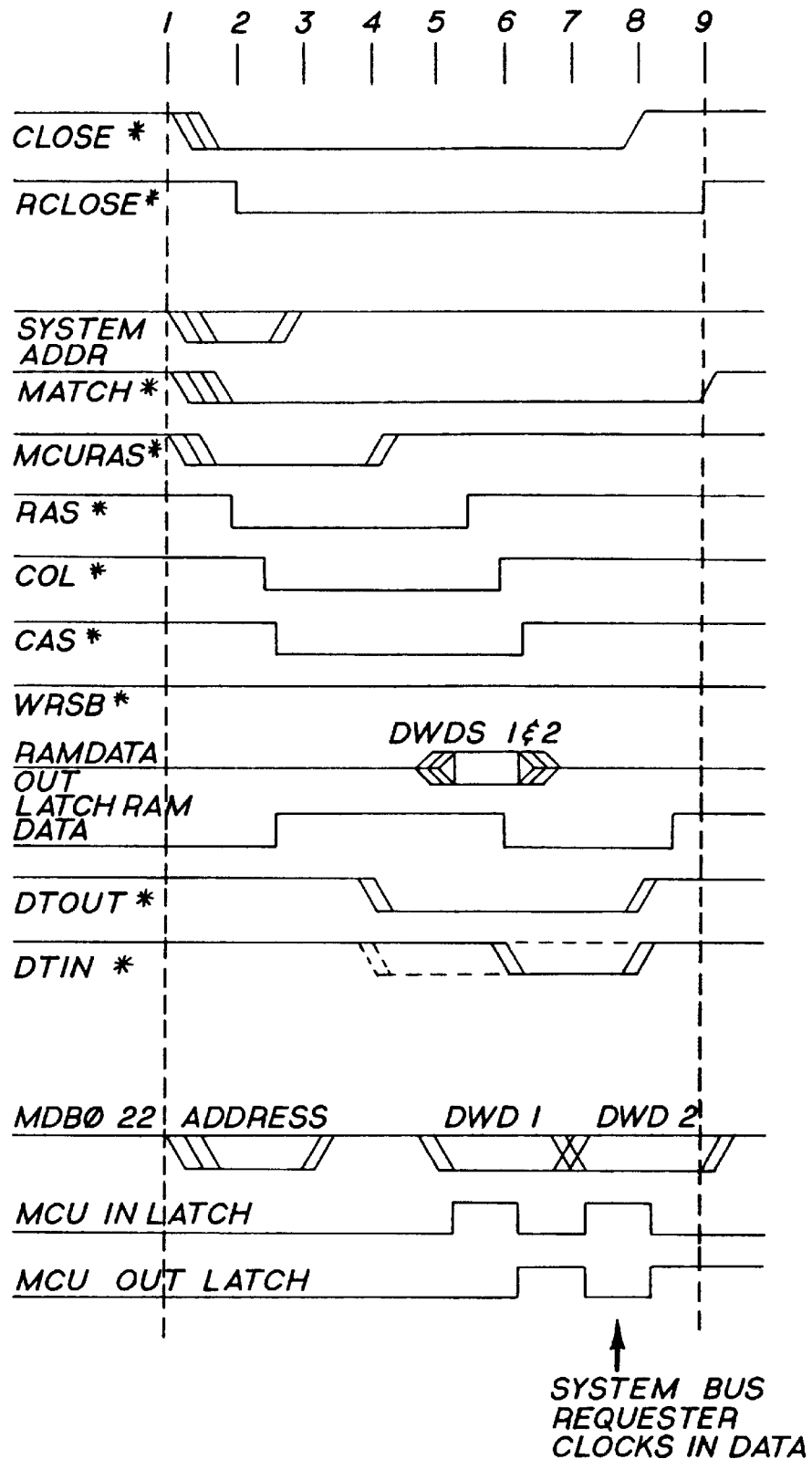
FIG. 6b shows a quad-word read cycle for a double-word width system.

FIG. 6 illustrates a quad-word read cycle wherein the QD bus is used, this cycle being similar in operation to the double-word read of FIG. 5. However, both the MDB0 and MDB1 buses are employed. Also, it can be seen that the DBWD* signal is asserted coincidentally with BWD* for indicating that both double-word memory planes 28 and 30 are being accessed. The diagram of FIG. 6 illustrates the quad-word MEMBUS 16 configuration, the QDBS* signal (not shown) being asserted from the backplane. If the double-word MEMBUS 16' of FIG. 2b is employed the latch L5 48 is employed to provide the odd memory plane double-word to MDBO in the MEMCLOCK8. Of course, the deassertion of the CLOSE* is delayed until the end of MEMCLOCK 8 in order to accommodate the additional time required to transfer the odd memory plane double-word to the MCU 14. FIG. 6a illustrates an octal-word read cycle and FIG. 6b a quad-word read for the double-word width bus case. The RCLOSE* signal is a registered CLOSE* signal.

Figure 7:
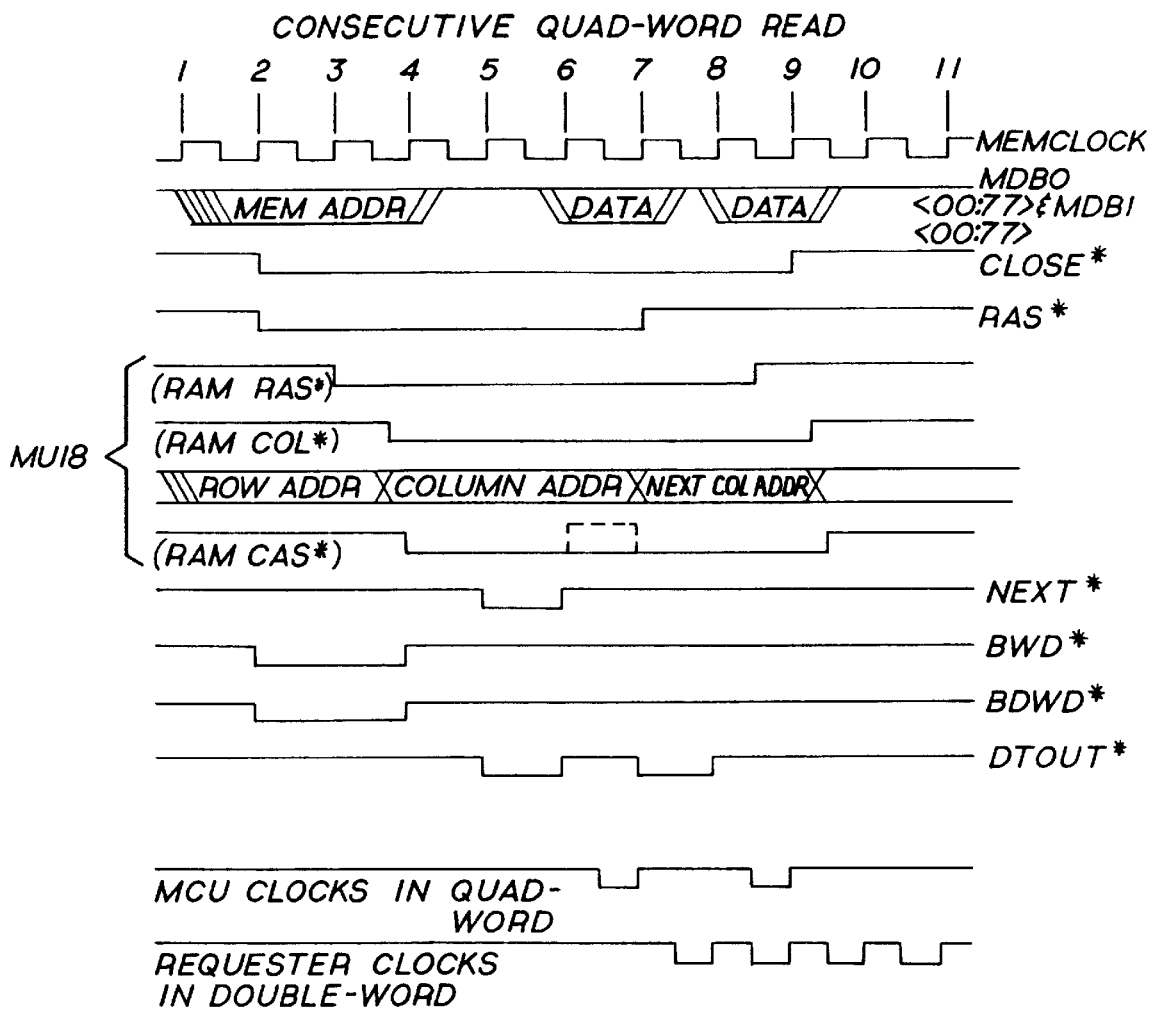
FIG. 7 shows the signal timing for a consecutive quad-word MU read operation.

FIG. 7 illustrates two consecutive quad-word read operations, it being realized that up to 128 quad-word reads may be accomplished in such manner. The memory access proceeds up to MEMCLOCK5 in a manner as previously described. At MEMCLOCK5 the NEXT* signal is asserted to indicate that a second quad-word read cycle is desired. The rising edge of NEXT* at MEMCLOCK6 causes the generation of the INCADDR signal thereby incrementing the column address counters 36a and 38b. If static column type DRAMs are installed RAM CAS* remains asserted and the change of state of the column address initiates the next DRAM access cycle. If page mode type DRAMs are installed RAM CAS* is deasserted, as indicated in dashed outline, for one MEMCLOCK cycle after which RAM CAS* is once more asserted to initiate the second DRAM access. DTOUT* is asserted a second time in order to retrieve the second quad-word of data. If more than two quad-words of data are required each quad-word is accessed by the assertion of NEXT* with an assertion of DTOUT*.

FIG. 8 illustrates a byte write operation. This type of write operation is achieved by initially performing a word or a double-word read of the memory plane having the byte to be written, merging within the MCU 14 the byte into the word or double-word and writing back the merged word or double-word to the memory plane. This portion of the cycle is accomplished from MEMCLOCK1 to MEMCLOCK7. At MEMCLOCK7 DTIN* is asserted and at MEMCLOCK8 WRSTRB* is asserted. The double-word containing the newly merged byte of data is also driven to MDBO<00:77> at MEMCLOCK8. It can be noted that RAM CAS* remains asserted throughout this read-modify-write type of access.

Figure 9:
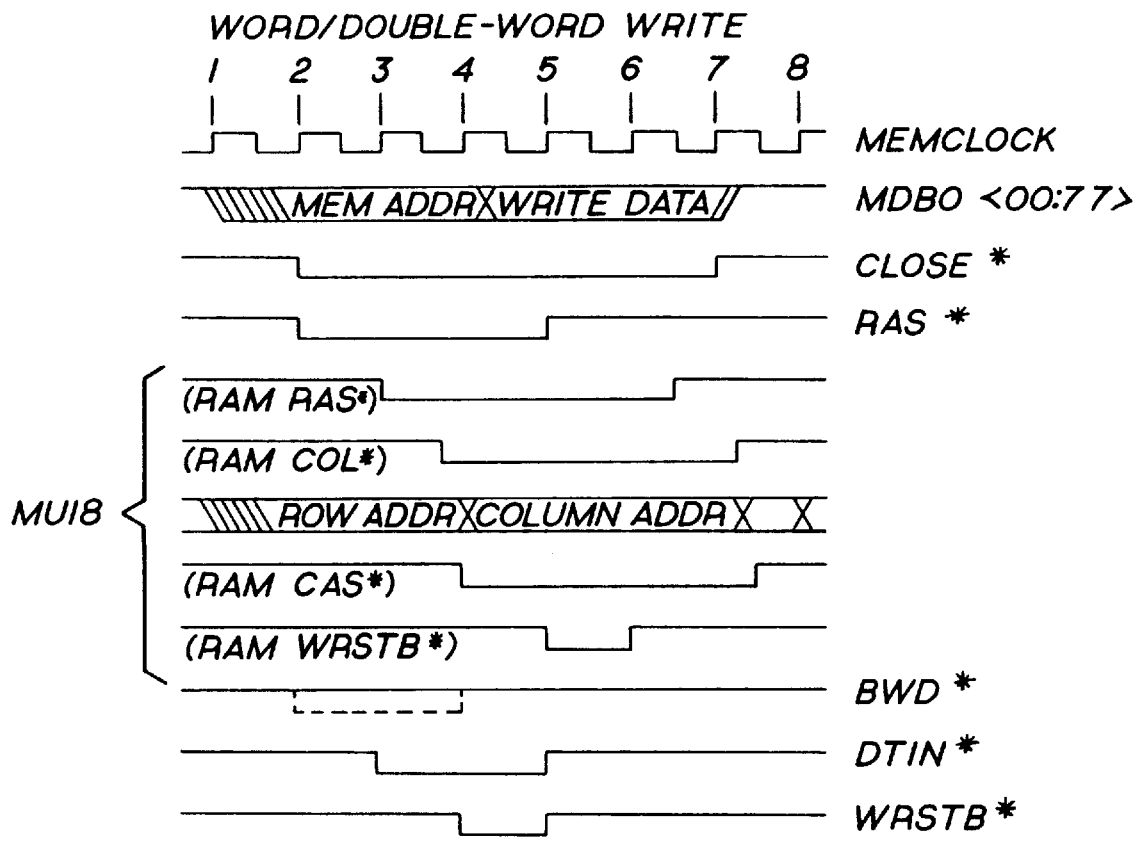
FIG. 9 shows the signal timing for a word/double-word write operation.

FIG. 9 illustrates a word or a double-word type of write cycle. BWD* is not asserted for a word write cycle but is asserted, as shown in dashed outline, at MEMCLOCK2 for the double-word case.

Figure 10:
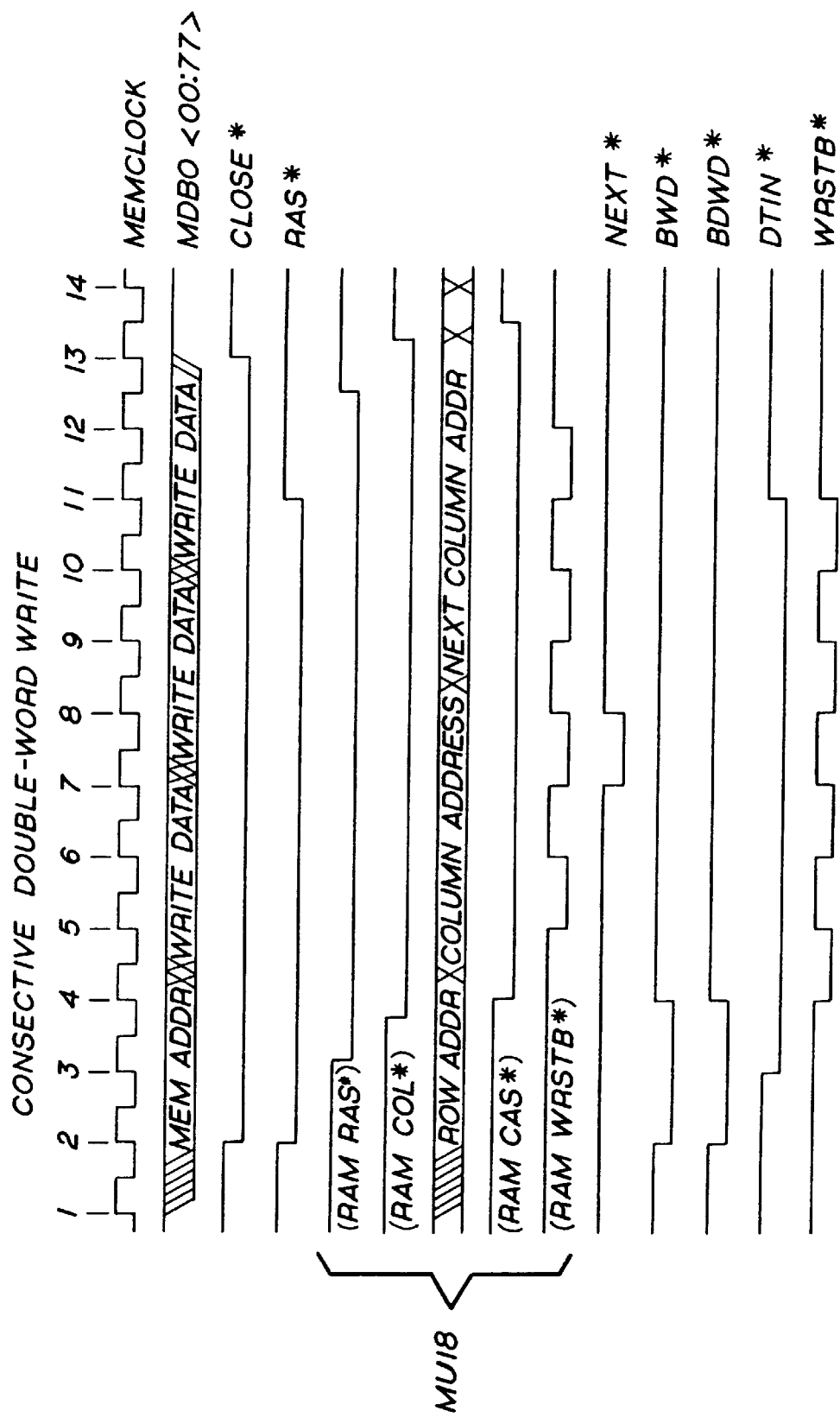
FIG. 10 shows the signal timing for a consecutive double-word write operation.

FIG. 10 illustrates a consecutive double-word write access. A first double-word is driven to MDBO<00:77> during MEMCLOCK4 in conjunction with WRSTB*. This first double-word is stored in either the odd or even memory plane depending on the state of the address (LA 28) driven during MEMCLOCK2 and MEMCLOCK3. A second double-word is driven at MEMCLOCK6 along with WRSTRB* and the second double-word is stored in the memory plane not previously written. NEXT* is asserted at MENCLOCK7, the rising edge of which at MEMCLOCK8 causes the column address to increment via counters 36a and 38b. The third and fourth double-words are driven, along with an associated WRSTB*, during MEMCLOCK8–12 for storage within the memory planes. Both BWD* and BDWD* are asserted at MEMCLOCK2 and DTIN* is asserted at MEMCLOCK3. If an additional double-word write access were required NEXT* would be reasserted at MEMCLOCK11 with CLOSE*, RAS* and DTIN* remaining asserted.

FIG. 11 illustrates a refresh operation which is periodically initiated by the MCU 14 for refreshing the DRAMs. The refresh operation is performed as a word or double-word read operation similar to that of FIG. 5. The word or double-word of data, including ECC syndrome bits, which is read from the refreshed location is processed by error detection and correction circuitry within the MCU 18 to detect and correct single bit errors or to detect multiple bit errors. During a refresh cycle the RFRSH* signal is asserted by the MCU 14 in conjunction with CLOSE*, RAS* and BWD*. FIG. 11 shows the case where no errors are detected.

FIG. 12 illustrates a refresh operation wherein a bit of the word or double-word is found to be in error. As can be readily seen, the operation of this refresh cycle during MEMCLOCK1–8 is identical to that of FIG. 11. In that a bit is in error the error is corrected by the MCU 14 and a word or double-word write cycle is initiated at MEMCLOCK8 in order to write the corrected word or double-word back into the memory location from which it was read. This MCU 14 initiated write cycle can be seen to be identical to that of FIG. 9 with BWD* asserted.

While the invention has been particularly shown and described with respect to a preferred embodiment thereof, it will be understood by those skilled in the art that changes in form and details may be made therein without departing from the scope and spirit of the invention.

What is claimed is:

1. A memory control unit coupled during use to a system bus for receiving memory addresses therefrom, said memory control unit further being coupled during use to one or more memory units by a second bus, the second bus including a plurality of signal lines for transmitting, during a memory access cycle, a memory address to the one or more memory units, each of said one or more memory units being comprised of a plurality of semiconductor memory devices having a plurality of addressable memory storage locations, said memory control unit further including means, coupled to and responsive to a signal asserted on the second bus by one of the memory units selected by the transmitted memory address, the asserted signal indicating an access speed of the selected memory unit, for specifying a duration of the memory access on an access-by-access basis so as to make a duration of the memory access cycle compatible with the access speed of at least the semiconductor memory devices of the selected memory unit.

2. A memory control unit as set forth in claim 1 wherein the memory control unit further includes means, responsive to a multi-information unit memory read cycle requested by a bus agent coupled to the system bus, for asserting and deasserting on the second bus a signal line to a selected one of the memory units, the signal line being asserted and deasserted a number of times that is a function of a number of information units requested to be read by the bus agent for causing successive accesses of semiconductor memory devices of said selected one of the memory units.

3. A computer memory system, said computer memory system comprising:

at least one memory unit comprised of a plurality of dynamic random access memories (DRAMs) having a plurality of addressable memory storage locations; and a memory control unit coupled during use to a system bus for receiving memory addresses from the system bus, said memory control unit further being coupled during use to said at least one memory unit by a second bus, the second bus including a plurality of signal lines for transmitting, during a current memory access cycle, a memory address to the at least one memory unit from said memory control unit; wherein said at least one memory unit is further comprised of memory address decoder means and circuit means, responsive to said decoder means decoding a memory address that selects said memory unit, for asserting on said second bus at least one signal for indicating an access timing characteristic of said DRAMs that comprise said memory unit; and wherein said memory control unit is coupled to and responsive to said at least one signal being asserted on the second bus by a selected memory unit for controlling memory access control signals on said second bus so as to make a timing of the current memory access cycle compatible with the indicated access timing characteristic of the DRAMs of said selected memory unit.

4. A computer memory system as set forth in claim 3 wherein the memory control unit further includes means, responsive to a multi-information unit memory read cycle requested by a bus agent coupled to the system bus, for asserting and deasserting on the second bus a signal line to a selected memory unit, the signal line being asserted and deasserted a number of times that is a function of a number of information units requested to be read by the bus agent for causing successive accesses of said DRAMs of said selected memory unit.

5. A computer memory system as set forth in claim 3, wherein said at least one signal indicates that said DRAMs of said selected memory unit are static column DRAMs.

6. A computer memory system as set forth in claim 3, wherein said at least one signal indicates a memory access timing that is being generated by said selected memory unit in accessing said DRAMs.

* * * * *